United States Patent [19]

Sonuparlak et al.

[11] Patent Number: 5,221,558

[45] Date of Patent: Jun. 22, 1993

[54] METHOD OF MAKING CERAMIC COMPOSITE BODIES

[75] Inventors: Birol Sonuparlak, Newark; Kenneth S. Hatton, Wilmington; Dennis J. Landini, Newark; Sylvia J. Canino, Newark; Michael K. Aghajanian, Newark, all of Del.

[73] Assignee: Lanxide Technology Company, LP, Newark, Del.

[21] Appl. No.: 746,678

[22] Filed: Aug. 16, 1991

Related U.S. Application Data

[63] Continuation-in-part of Ser. No. 464,171, Jan. 12, 1990, abandoned.

[51] Int. Cl.⁵ .................................................. C04B 35/56
[52] U.S. Cl. ............................... 427/376.1; 427/376.2; 427/379; 427/386; 427/397.7; 427/399; 501/128; 501/120; 501/89
[58] Field of Search .............. 427/376.2, 379, 386, 427/397.7, 399, 376.1; 501/128, 120, 89

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,909,895 | 10/1975 | Abraham | 29/95 A |
| 3,973,977 | 8/1976 | Wilson | 106/62 |
| 4,312,899 | 1/1982 | Lahmann | 428/701 |
| 4,497,874 | 2/1985 | Hale | 428/69 S |
| 4,567,103 | 1/1986 | Sara | 428/698 |
| 4,837,232 | 6/1989 | Luszcz et al. | 501/127 |
| 4,851,375 | 7/1989 | Newkirk et al. | 501/127 |
| 4,853,352 | 8/1989 | Newkirk et al. | 501/127 |
| 4,859,640 | 8/1989 | Newkirk | 501/127 |
| 4,874,569 | 10/1989 | Kuszyk et al. | 501/127 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 3/1986 | European Pat. Off. . |
| 0643166 | 5/1984 | Switzerland . |

OTHER PUBLICATIONS

"Oxidation of Molten Aluminum Alloys, Reaction with Refractories"–M. Drouzy and M. Richard–Mar. 1974 Fonderie, France No. 332 pp. 121–128.

"Refractories for Aluminum Alloy Melting Furnaces'-'-B. Clavaud and V. Jost–Sep., 1980–Lillian Brassinga (from French) Jan., 1985.

*Primary Examiner*—Karl Group
*Attorney, Agent, or Firm*—Mark G. Mortenson; Stanislav Antolin

[57] ABSTRACT

The present invention relates to methods for producing self-supporting ceramic and ceramic composite bodies having a protective surface region on at least a portion of the surface of the formed bodies, and bodies produced thereby.

32 Claims, 11 Drawing Sheets

METHOD OF MAKING CERAMIC COMPOSITE BODIES

CROSS-REFERENCE TO RELATED APPLICATIONS

This application is a continuation-in-part application of U.S. patent application Ser. No. 07/464,171, which was filed on Jan. 12, 1990 (now abandoned in the names of Birol Sonuparlak et al. and entitled "Method of Making Ceramic Composite Bodies and Bodies Made Thereby," the subject matter of which is herein expressly incorporated by reference.

FIELD OF THE INVENTION

The present invention relates to methods for producing self-supporting ceramic and ceramic composite bodies having a protective surface region on at least a portion of the surface of the formed bodies, and bodies produced thereby.

BACKGROUND OF THE INVENTION AND DISCUSSION OF COMMONLY OWNED PATENTS AND PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse types of filler material such as particulates, fibers, rods, and the like.

There are several known limitations or difficulties in substituting ceramics for metals, such as scaling versatility, capability to produce complex shapes, satisfying the properties required for the end use application, and costs. Several copending patent applications, and Issued Patents, assigned to the same owner as this application (hereinafter sometimes referred to as "Commonly Owned Patent Applications and Patents"), overcome these limitations or difficulties and provide novel methods for reliably producing ceramic materials, including composites. The method is disclosed generically in Commonly Owned U.S. Pat. No. 4,713,360, issued on Dec. 15, 1987 in the names of Marc S. Newkirk et al. and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, issued on Aug. 1, 1989, in the names of Marc S. Newkirk et al and entitled "Method of Making Self-Supporting Ceramic Materials and Materials Made Thereby", which issued from U.S. patent application Ser. No. 220,935, filed Jun. 23, 1988, which is a continuation-in-part of U.S. patent application Ser. No. 822,999, filed Jan. 27, 1986 (and now abandoned), which is a continuation-in-part of U.S. patent application Ser. No. 776,965, filed Sep. 17, 1985 (and now abandoned), which is a continuation-in-part of U.S. patent application Ser. No. 747,788, filed Jun. 25, 1985 (and now abandoned), which is a continuation-in-part of U.S. patent application Ser. No. 632,636, filed Jul. 20, 1984 (and now abandoned), all in the names of Marc S. Newkirk et al. and entitled "Methods of Making Self-Supporting Ceramic Materials".

A similar oxidation phenomenon was utilized to grow oxidation reaction product into a filler material to produce ceramic composite bodies, as described in Commonly Owned U.S. Pat. No. 4,916,113, which issued on Apr. 10, 1990, from U.S. patent application Ser. No. 265,835, filed Nov. 1, 1988, both of which are entitled "Methods of Making Composite Ceramic Articles." Patent application Ser. No. 265,835 is a 5 continuation of U.S. patent application Ser. No. 819,397, (now U.S. Pat. No. 4,851,375, entitled "Methods of Making Composite Ceramic Articles Having Embedded Filler"), which was a continuation-in-part of U.S. patent application Ser. No. 697,876, filed Feb. 4, 1985 (and now abandoned), in the names of Marc S. Newkirk et al. and entitled "Composite Ceramic Articles and Methods of Making Same". Specifically, these applications and patents disclose novel methods for producing a self-supporting ceramic composite by growing an oxidation reaction product from a parent metal into a permeable mass of filler (e.g., a silicon carbide particulate filler), thereby infiltrating the filler with a ceramic matrix. The resulting composite, however, has no defined or predetermined geometry, shape, or configuration.

A method for producing ceramic composite bodies having a predetermined geometry or shape is disclosed in Commonly Owned U.S. Pat. No. 5,017,526, which issued on May 21, 1991, from U.S. patent application Ser. No. 338,471, filed Apr. 14, 1989, which is a continuation of U.S. patent application Ser. No. 861,025, filed May 8, 1986, and now abandoned, all in the names of Marc S. Newkirk et al. and entitled "Shaped Ceramic Composites and Methods of Making the Same" (a corresponding EPO application was published in the EPO on Nov. 11, 1987, as EPO Publication No. 0245192). In accordance with the method in this U.S. Patent, the developing oxidation reaction product infiltrates a permeable preform of filler material (e.g., a silicon carbide preform material) in a direction towards a defined surface boundary.

It was discovered that high shape fidelity is more readily achieved by providing the preform with a barrier means, as disclosed in Commonly Owned U.S. Pat. No. 4,923,832, which issued on May 8, 1990, from U.S.

patent application Ser. No. 861,024, filed May 8, 1986, in the names of Marc S. Newkirk et al. (a corresponding EPO application was published in the EPO on Nov. 11, 1987, as EPO Publication No. 0245193). This method produces shaped self-supporting ceramic bodies, including shaped ceramic composites, by growing the oxidation reaction product of a parent metal to a barrier means spaced from the metal for establishing a boundary or surface. Ceramic composites having a cavity with an interior geometry inversely replicating the shape of a positive mold or pattern are disclosed in Commonly Owned U.S. patent application Ser. No. 329,794, now allowed, filed Mar. 28, 1989, which is a divisional application of U.S. Pat. No. 5 4,828,785, entitled "Inverse Shape Replication Method of Making Ceramic Composite Articles" which issued May 9, 1989, both in the names of Marc S. Newkirk et al, and in Commonly Owned U.S. Pat. No. 4,859,640, which issued on Aug. 22, 1989, from U.S. patent application Ser. No. 896,157, filed Aug. 13, 1986, in the name of Marc S. Newkirk, and entitled "Method of Making Ceramic Composite Articles with Shape Replicated Surfaces and Articles Obtained Thereby".

The feeding of additional molten parent metal from a reservoir has been successfully utilized to produce thick ceramic matrix composite structures. Particularly, as disclosed in Commonly Owned U.S. Pat. No. 4,918,034, which issued on Apr. 17, 1990, from U.S. patent application Ser. No. 168,358, filed Mar. 15, 1988, which is a continuation-in-part of U.S. Pat. No. 4,900,699, which issued on Feb. 13, 1990, from U.S. patent application Ser. No. 908,067, filed Sep. 16, 1986, both in the names of Marc S. Newkirk et al., and entitled "Reservoir Feed Method of Making Ceramic Composite Structures and Structures Made Thereby" (a corresponding EPO application was published in the EPO on Mar. 30, 1988, as EPO Publication No. 0262075), the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

Moreover, U.S. patent application Ser. No. 568,618 (now allowed), filed Aug. 16, 1990, which is a continuation of U.S. patent application Ser. No. 269,152, filed Nov. 9, 1988, both in the names of Robert C. Kantner et al. and entitled "Method for in situ Tailoring the Metallic Component of Ceramic Articles and Articles Made Thereby", which is a continuation of Commonly Owned U.S. patent application Ser. No. 152,518, filed on Feb. 5, 1988, in the same names and having the same title; which was a continuation-in-part of U.S. patent application Ser. No. 908,454, filed Sep. 17, 1986, in the names of Marc S. Newkirk et al. and having the same title. U.S. patent application Ser. No. 152,518, issued on Apr. 4, 1989, as U.S. Pat. No. 4,818,734, in the names of Robert C. Kantner et al. Each of these applications and Patent discloses a method for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of the previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Patent Applications and Patents discussed in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. As a first step, a parent metal is positioned adjacent to a mass of permeable filler (or a preform) which can be shaped and/or treated to be self-supporting. The parent metal is then heated to form a body of molten parent metal which is reacted with an oxidant, as described above, to form an oxidation reaction product. As the oxidation reaction product grows and infiltrates the adjacent filler material, molten parent metal is drawn through the previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure comprising a polycrystalline ceramic matrix embedding the filler. As also discussed above, the filler (or preform) may utilize a barrier means to establish a boundary or surface for the ceramic composite structure.

Moreover, methods of forming novel ceramic and ceramic composite structures with modified surfaces is discussed in several other Commonly Owned Patent Applications and Patents. U.S. patent application Ser. No. 587,593, filed Sep. 24, 1990, which is a continuation of U.S. patent application Ser. No. 308,889, filed Feb. 9, 1989, which is a continuation of U.S. application Ser. No. 908,117 (now U.S. Pat. No. 4,837,232, which issued Jun. 6, 1989), all in the names of Stanley Luszcz et al., and entitled "Dense Skin Ceramic Structure and Method of Making the Same", discloses methods for producing self-supporting ceramic structures comprising a polycrystalline material having a first region and a terminal region, the terminal region differing from the first region in at least one of composition and microstructure due to the claimed method. Particularly, the method of forming the first region of oxidation reaction product is carried out as discussed above in the Commonly Owned Patent Applications and Patent. The terminal region of oxidation reaction product is formed by attenuating, or discontinuing, the transport of molten parent metal from the formed body, and thereafter the reacting is resumed within the temperature range for a time sufficient to transport at least a portion of the interconnected molten parent metal from said first region towards a surface, thereby forming additional oxidation reaction product on the surface of the first region as the newly formed terminal region. In a specific embodiment of the claimed invention, a self-supporting ceramic or ceramic composite structure formed by the claimed method comprises a polycrystalline material having a first region and a terminal region which is integral with the first region. In another aspect of the claimed invention, the terminal region comprises an outer skin and the first region comprises a substrate surmounted by the terminal region, the terminal region having a finer microstructure than the first region. In another aspect of the claimed invention, the first region or a part thereof may be shaped prior to carrying out the second stage reacting on it, and a barrier means may be used to limit and define the extent of formation of the first region and/or the terminal region.

Moreover, a method for forming a ceramic or ceramic composite structure comprising a porous core with a dense surface layer is disclosed in U.S. Pat. No. 5,015,610, which issued on May 14, 1991, from U.S. patent application Ser. No. 414,183, filed Sep. 28, 1989, which is a divisional application of U.S. patent application Ser. No. 908,119, filed Sep. 16, 1986 (now U.S. Pat. No. 4,956,137, which issued on Sep. 11, 1990), both in the name of Ratnesh K. Dwivedi, and entitled "Porous Ceramic Composite with Dense Surface" (a corresponding EPO application was published in the EPO on Mar. 23, 1988, as EPO Publication No. 0261050). The claimed invention relates to forming a self-supporting ceramic composite article by incorporating particulate parent metal within a porous preform, the volume percent of parent metal being sufficient to form a volume of oxidation reaction product which exceeds the total spatial volume available within the preform. The particulate parent metal is made molten and thereafter reacted with an oxidant to form oxidation reaction product, as discussed above. The oxidation reaction product grows into and through the preform, thus transporting molten parent metal towards the oxidant to at least one surface of the preform, wherein a dense surface layer of oxidation reaction product is formed on said at least one surface. Due to the oxidation of the parent metal and the subsequent transport of molten parent metal within the formed oxidation reaction product, porosity is created within the preform, thus resulting in a porous core surrounded by a dense skin.

A method for post-treating formed ceramic and ceramic composite bodies to produce self-supporting ceramic bodies containing or having incorporated therein a second polycrystalline ceramic component is disclosed in U.S. patent application Ser. No. 547,405, filed on Jul. 2, 1990, which is a continuation of U.S. patent application Ser. No. 272,514, filed Nov. 16, 1988, which is a continuation of U.S. application Ser. No. 908,458, filed Sep. 17, 1986 (now issued as U.S. Pat. No. 4,806,508), all in the names of Ratnesh K. Dwivedi et al., and entitled "Modified Ceramic Structures and Methods of Making the Same". Specifically, the second ceramic component formed by the method of this invention is sufficient to alter, modify or contribute to the properties of the ceramic body formed originally. In accordance with the method of the invention, the original ceramic body is grown by an oxidation reaction of a parent metal with an oxidant, wherein molten parent metal is transported continuously through previously formed oxidation reaction product, as discussed above in the Commonly Owned Patent Applications and Patents. The ceramic body may include interconnected porosity, due to, for example, complete reaction (i.e., exhaustion) of interconnected metal which was transported during growth of oxidation reaction product. If such interconnected parent metal phase formed during growth of oxidation reaction product is not fully oxidized to form porosity within the body, such parent metal may be removed by a post-oxidation treatment such as acid leaching. Further, the porosity in the formed body is at least partially open or accessible or rendered accessible from at least one external surface of the body. A second ceramic material, or a precursor thereof, is then contacted with the ceramic body at the accessible surface(s) of the formed body so as to infiltrate or impregnate at least a portion of the interconnected porosity in the formed body.

Self-supporting ceramic composites formed by the directed oxidation of a parent metal into a permeable mass of filler material may be subjected to a post-formation heating step to remove or oxidize residual non-oxidized metallic constituents of the formed composites. Specifically, U.S. patent application Ser. No. 414,198, filed Sep. 28, 1989, which is a divisional application of U.S. patent application Ser. No. 002,048, filed Jan. 12, 1987 (and now issued as U.S. Pat. No. 4,874,569), both in the names of Jack A. Kuszyk et al., and entitled "Ceramic Composite and Methods of Making the Same" discloses ceramic or ceramic composite bodies obtained by the oxidation of a molten parent metal comprising an aluminum alloy to produce a polycrystalline material comprising the oxidation reaction product of the parent metal with at least one oxidant which embeds at least one filler material, thereby forming the ceramic composite body. In a subsequent step, the formed composite body is heated in at least one environment selected from the group consisting of an oxygen-containing atmosphere, an inert atmosphere and a vacuum to a second temperature above the temperature at which the oxidation reaction product was formed, but below the melting point of the oxidation reaction product, to remove or oxidize at least a substantial portion of the residual non-oxidized metallic constituents of the parent metal without substantial formation of oxidation reaction product beyond the defined surface boundary, thereby producing a self-supporting ceramic composite.

Commonly owned U.S. patent application Ser. No. 681,467, filed Apr. 4, 1991, which is a continuation of U.S. patent application Ser. No. 415,090, filed Sep. 29, 1989, which is a divisional application of U.S. Pat. No. 4,957,779, which issued on Sep. 18, 1990, from U.S. patent application Ser. No. 157,342, filed Feb. 18, 1988, all in the names of Virgil Irick, Jr. et al. and entitled "A Method for Producing A Protective Layer on a Ceramic Body and A Method of Using A Ceramic Body" discloses a method for producing a protective layer on a ceramic or a ceramic composite body and a method of using the formed ceramic or ceramic composite body in an environment which causes the body to react with gaseous species to form a protective layer. Specifically, ceramic and ceramic composite bodies formed by the methods of the Commonly-Owned Patent Applications and Patents discussed above are exposed to an environment which causes a protective layer to be formed on at least a portion of an external surface of the ceramic composite body. In a preferred embodiment, growth of the above-discussed ceramic composite body may be changed by modifying the oxidant to which the parent metal is exposed. Specifically, the oxidant, whether a solid, liquid or vapor-phase oxidant, or any combination thereof, can be modified to result in the formation of the aforementioned protective layer. Alternatively, in a second embodiment of the invention, the above-described ceramic or ceramic composite body may be completely formed, and, in a subsequent step, subjected to a different oxidant (e.g., different from the oxidant employed to form the ceramic or ceramic composite body).

Thus, the aforesaid Commonly Owned Ceramic Matrix Patents and Patent Applications describe the production of oxidation reaction products which are readily grown to desired sizes and thicknesses and which may be modified to produce ceramic bodies heretofore believed to be difficult, if not impossible, to achieve with conventional ceramic processing techniques.

The entire disclosures of all of the foregoing Commonly Owned Ceramic Matrix Patents and Patent Applications are expressly incorporated herein by reference.

SUMMARY OF THE INVENTION

In accordance with the present invention, there is provided a method for producing self-supporting ceramic or ceramic composite structures comprising (i) a ceramic matrix obtained by oxidation of a parent metal to form a polycrystalline material, optionally embedding a filler material, and (ii) a protective surface region on at least a portion of the surface of the ceramic or ceramic composite structure, which is formed upon reaction of at least two components of the ceramic or ceramic composite structure and which protective surface region has a primary chemical constituent different from the primary chemical constituent of the ceramic or ceramic composite structure.

Generally, the present invention is based upon the discovery that ceramic and ceramic composite bodies resulting from the oxidation of a metal (hereinafter referred to as the "parent metal" and defined below) as described in the above-referenced Commonly Owned Ceramic Matrix Patents and Patent Applications can be modified in a post-formation step to form a protective surface region on at least a portion of the ceramic or ceramic composite body. In the interest of brevity, ceramic composite bodies will be referred to primarily herein. However, it should be understood that ceramic bodies (i.e., bodies which do not include a filler material) may be formed with a protective surface region thereon.

The unique structure of the ceramic composite bodies formed as described in the above-referenced Commonly Owned Ceramic Matrix Patents and Patent Applications (i.e., three-dimensionally interconnected metal and ceramic) allows the formation of a surface layer on ceramic matrix composite bodies upon reaction of at least two constituents of the formed composite. Specifically, at a temperature above the melting point of at least one component of the ceramic substrate body, at least two constituents of the ceramic substrate (e.g., different metallic constituents, fillers, the ceramic matrix, etc.) may be drawn out (e.g., through the interconnected metal channels) of the composite substrate and may react (e.g., with each other, with at least one component of the atmosphere, with an additional component provided to the system, and/or any combination of these components) to form a surface layer which isolates the internal structure of the composite from an external atmosphere. The surface layer that is formed is preferably compatible (e.g., chemically and/or physically) with the ceramic composite substrate.

In accordance with the present invention, ceramic composite bodies are produced by the formation of an oxidation reaction product of a molten parent metal (e.g., aluminum) with an oxidant which embeds a filler material, the filler material being configured in either an unbonded mass or as a preform. Subsequently, the ceramic composite body is heated to a temperature which is higher than the melting point of at least one component of the ceramic substrate. At this higher temperature, at least two components of the ceramic composite body react to form at least one protective surface region on at least a portion of the surface of the ceramic composite body. This protective surface region, which has a primary chemical constituent different from the primary chemical constituent of the ceramic substrate, comprises oxidized constituents of the formed ceramic composite substrate. Specifically, the formed ceramic composite body is heated to a temperature which is sufficient to allow unoxidized components of the ceramic composite body (e.g., metal, filler, etc.) to react with at least one oxidant to form at least one protective region on at least a portion of the surface of the ceramic composite body.

In a preferred embodiment, a formed ceramic composite body is heated to a temperature which is higher than the melting point of at least one component of the ceramic substrate. At the higher temperature, at least two components of the ceramic composite body (e.g., unoxidized metal, filler material, etc.) may react with, for example, each other, with at least one component of the atmosphere, with some external material provided to the system, and/or any combination of the above, to form at least one protective region on at least a portion of the surface of the ceramic composite body.

In another preferred embodiment, prior to heating the ceramic composite substrate to a higher temperature to form a protective layer, the ceramic composite substrate may be subjected to a treatment (e.g., thermal etching or chemical etching) to remove at least a portion of the metallic constituent of the ceramic composite substrate at the surface of the substrate. Subsequently, the ceramic composite substrate is heated to the higher temperature to allow formation of a protective surface region on and/or to a depth within the surface of the ceramic composite substrate. The depth of formation of the protective surface region within the ceramic composite substrate may be controlled by varying, for example, the extent to which the metallic constituent has been removed from the surface of the composite substrate, the time at temperature, etc.

The protective surface region on the formed body may serve to protect the underlying ceramic composite substrate upon exposure of the formed body to environments which are harmful or detrimental (e.g., corrosive, high temperature, etc.) to the ceramic substrate. For example, upon exposure of ceramic composite bodies which do not possess a protective surface region to elevated temperatures at which at least one metallic constituent of the ceramic composite becomes molten, the ceramic composite may exhibit bleed-out of the molten metallic constituent within the ceramic composite, thus weakening the structure of the ceramic composite. Moreover, upon exposure of the molten metallic constituent of a ceramic composite to an oxidizing environment, as exemplified in FIGS. 1a and 1b, the metallic constituent may oxidize to form oxidation reaction product of the molten metallic constituent on the surface of the ceramic composite, which may weaken the structure of the ceramic composite, as well as negatively affect the dimensional integrity of the ceramic composite. By providing a protective surface region on a ceramic composite substrate, the protective surface region may act to not only retain any molten metallic constituent within the ceramic composite substrate, thus alleviating the problem of bleed-out of molten metal, but also may act to isolate the molten metallic constituent of the ceramic composite substrate from an oxidizing environment, thus inhibiting the formation of oxidation reaction product beyond the surface of the ceramic composite body.

Moreover, with respect to corrosion resistance, by providing a protective surface region on at least a portion of a ceramic composite substrate, upon exposure of the ceramic composite to an environment which may have corrosive effects on the metallic constituent of the ceramic composite substrate, the protective surface region may act to isolate the metallic constituent of the ceramic composite from the corrosive environment, thus inhibiting corrosion of the ceramic composite substrate.

DEFINITIONS

As used herein in the specification and the appended claims, the terms below are defined as follows:

"Alloy Side" as used herein refers to that side of the ceramic matrix composite which initially contacted molten metal before the oxidation reaction product of that molten metal and an oxidant infiltrated the preform or mass of filler material.

"Aluminum", etc., as used herein means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Barrier" or "barrier means" as used herein may be any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass" as used herein refers to any of the original body of parent metal remaining which has not been consumed during formation of the ceramic or ceramic composite body and typically, which remains in at least partial contact with the formed body. It should be understood that the carcass may also typically include some oxidized constituents of the parent metal or matrix metal and/or a second or foreign metal therein.

"Ceramic" as used herein should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1-40 percent by volume, but may include still more metal.

"Ceramic Composite Body" or "Ceramic Matrix Composite" as used herein means any ceramic matrix embedding a filler material.

A Chemical Constituent "Different" from the primary chemical constituent of the composite body means a chemical constituent which does not comprise or contain, as a primary constituent, the same primary chemical constituent as that of the composite body (e.g., if the primary chemical constituent of the composite body is alumina, the "different" chemical constituent could be, for example, silica).

"Dopants" as used herein means materials (alloy constituents or constituents combined with and/or included in and/or in or on a filler) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may:

(1) create favorable surface energy relationships which enhance or induce the wetting of the oxidation reaction product by the molten parent metal;

(2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product;

(3) cause microstructural modifications of the oxidation reaction product as it is formed or subsequently, alter the metallic constituent composition and properties of such oxidation reaction product; and/or (4) enhance growth nucleation and uniformity of growth of oxidation reaction product.

"Filler" as used herein is intended to include either single constituents or mixtures of constituents which are substantially nonreactive with and/or of limited solubility in the metal (e.g., parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Growth Alloy" as used herein means any alloy which (1) contains initially, or (2) obtains at some point during processing, a sufficient amount of requisite constituents to result in growth of oxidation reaction product therefrom.

"Liquid-Phase Oxidant" or "Liquid Oxidant" as used herein means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic body, is impregnated with the oxidant (e.g., by coating or immersion in the oxidant).

"Nitrogen-Containing Gas Oxidant" as used herein means is a particular gas or vapor in which nitrogen is the sole, predominant or at least a significant oxidizer of the parent or precursor metal under the conditions existing in the oxidizing environment utilized.

"Oxidant" as used herein means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, a halogen, sulphur, phosphorus, arsenic, carbon, boron, selenium, tellurium, and/or compounds and combinations thereof, for example, silica or silicates (as a source of oxygen), methane, ethane, propane, acetylene, ethylene, propylene (the hydrocarbon as a source of carbon), and mixtures such as air, $H_2/H_2O$ and $CO/CO_2$ (source of oxygen), the latter two (i.e., $H_2/H_2O$ and $CO/CO_2$) being useful in reducing the oxygen activity of the environment.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of reaction of one or more metals with one or more oxidants.

"Oxygen-Containing Gas Oxidant" as used herein means a particular gas or vapor in which oxygen is the sole, predominant or at least a significant oxidizer of the parent or precursor metal under the conditions existing in the oxidizing environment utilized.

"Parent Metal", as used herein, means that metal(s) (e.g., aluminum, silicon, titanium, tin and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for growing oxidation reaction product, such mass retaining sufficient shape integrity and green strength to provide dimensional fidelity prior to being infiltrated by the growing ceramic matrix. This mass is: (1) sufficiently porous to permit the vapor-phase oxidant (if a vapor-phase oxidant is used) to permeate the preform and contact parent metal, and (2) sufficiently permeable to accommodate development or growth of oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reactive Filler" means that the filler interacts with molten parent metal (e.g., is reduced by the parent metal and/or oxidation reaction product and thus modifies the composition of the parent metal and/or provides an oxidant for formation of the oxidation reaction product).

"Reservoir", as used herein means a separate body of parent metal positioned relative to a mass of filler or a preform so that, when the metal is molten, it may flow to replenish, or in some cases to initially provide and subsequently replenish, that portion, segment or source of parent metal which is in contact with the filler or preform and infiltrating or reacting to form the oxidation reaction product.

"Second or Foreign Metal" means any suitable metal, combination of metals, alloys, intermetallic compounds, or sources of either, which is, or is desired to be, incorporated into the metallic component of a formed ceramic body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant" as used herein means an oxidant in which the identified solid is the sole, predominant or at least a significant oxidizer of the parent or precursor metal under the conditions of the process.

When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which absorb the excess heat. An example of such a suitable inert filler is one which is identical, or substantially identical, to the intended oxidation reaction product.

"Vapor-Phase Oxidant" as used herein means that the oxidant contains or comprises a particular gas or vapor and further means an oxidant in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen).

DETAILED DESCRIPTION OF THE INVENTION AND PREFERRED EMBODIMENTS

Figure 1:
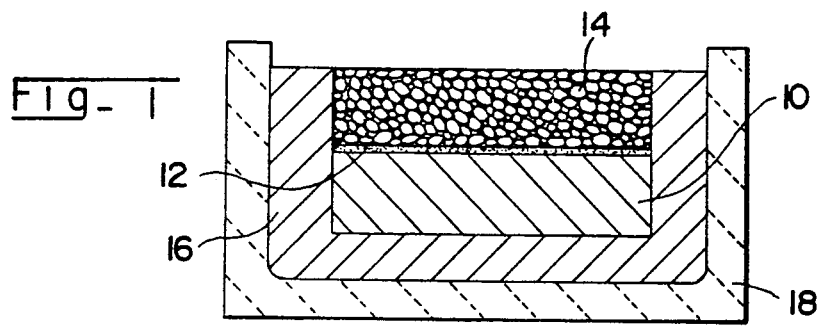
FIG. 1 is a cross-sectional lay-up of the assembly for forming ceramic matrix composite bodies in accordance with the method of the present invention.

The present invention relates to ceramic composite bodies having thereon a protective surface region which has a chemical constituent different from the primary chemical constituent of the ceramic composite body on at least a portion of the surface of the ceramic composite body. The ceramic composite bodies of the instant invention are produced by reacting a body of molten parent metal with an oxidant to form an oxidation reaction product which at least partially embeds (i.e., grows into) at least one filler material. In a subsequent heat treatment step, a protective surface region is formed on the ceramic composite body upon oxidation of at least one of the constituents of the formed body.

In accordance with the present invention, ceramic composite bodies are produced by the formation of an oxidation reaction product of a molten parent metal (e.g., aluminum) with an oxidant which embeds a filler material, the filler material being configured in either an unbonded mass or as a preform. Subsequently, either in situ or in a post-processing step, the ceramic composite body is heated to a temperature which is higher than the processing temperature of the oxidation reaction product. At this temperature, at least two components of the ceramic composite body react to form at least one protective surface region on at least a portion of the surface of the ceramic composite body. This protective surface region, which has a primary chemical constituent different from the primary chemical constituent of the ceramic substrate, comprises oxidized constituents of the formed composite substrate. Specifically, the formed ceramic composite body is heated to a temperature which is sufficient to allow unoxidized components of the ceramic composite body (e.g., metal, filler, etc.) to react with at least one oxidant to form at least one protective region on at least a portion of the surface of the ceramic composite body.

In a preferred embodiment, a formed ceramic composite body is heated to a temperature which is higher than the melting point of at least one component of the formed ceramic composite body. At the higher temperature, at least two components of the ceramic composite body (e.g., unoxidized metal, filler material, etc.) may react, for example, with each other, with at least one component of the atmosphere, with some external material provided to the system, and/or any combination of the above, to form at least one protective region on at least a portion of the surface of the ceramic composite body. For example, a ceramic composite body comprising silicon carbide reinforced alumina, formed by the directed oxidation of a molten aluminum alloy which embeds a silicon carbide filler, may be heated to a temperature higher than the melting point of at least one component of the formed composite. At this higher temperature, at least two constituents of, for example, the aluminum alloy (e.g., aluminum, silicon, etc.), which may be present in the interconnected metal channels of the composite, may be drawn out of the composite substrate to react with, for example, air in the atmosphere to form alumina, silica, complex aluminosilicates, etc., depending on processing conditions, thermodynamics, etc. The resulting oxidation products of the silicon and aluminum with air may form at least one protective layer on at least a portion of the surface of the composite substrate. Alternatively, at least some of the silicon carbide filler material may react with at least one of the atmosphere, a component of the metallic phase, the matrix, etc., to form at least one reaction product (e.g., silica, complex aluminosilicate, etc.) which forms a protective surface region on at least a portion of the composite substrate.

In another preferred embodiment, prior to heating the ceramic composite substrate to a temperature higher than the processing temperature of the oxidation reaction product to form a protective layer, the ceramic composite substrate may be subjected to a treatment (e.g., thermal etching or chemical etching) to remove at least a portion of the metallic constituent of the ceramic composite substrate at the surface of the substrate. Subsequently, the ceramic composite substrate is heated to the higher temperature to allow formation of a protective surface region on and/or to a depth within the surface of the ceramic composite substrate. The depth of formation of the protective surface region within the ceramic composite substrate may be controlled by varying, for example, the extent to which the metallic constituent has been removed from the surface of the composite substrate, the time at temperature, etc. Various techniques for removing at least a portion of metallic constituent from the formed composite may be employed.

A first method or means of removing interconnected metal is to place the first ceramic body in an inert bed that is contained within a crucible or other refractory container. The container and its contents are then placed into a furnace having an inert atmosphere (e.g., argon or any other non-reactive gas) and heated to temperatures where the metallic constituent will have a high vapor pressure. This temperature or preferred range can vary depending upon such factors as the composition of the first parent metal, the time of heating, and the end composition of the metallic constituent in the first ceramic body. At the suitable temperature, interconnected metal will vaporize from the ceramic body but no additional oxidation reaction product will form because of the inert atmosphere. By maintaining these temperatures, the interconnected metal will continue to vaporize and be carried away from the furnace as by a suitable venting means within the furnace.

A second method or means of removing interconnected metal is to immerse the first ceramic body into a suitable leachant to dissolve or disperse out the interconnected metal. The leachant may be any acidic or caustic liquid or gas, which will depend upon such factors as the composition of metal, the time of immersion, etc. In the case of using aluminum as the first parent metal, and therefore having aluminum in the interconnected metal, HCl has been found to be a suitable acidic medium. If the ceramic body contains silicon, NaOH and/or KOH solutions are an acceptable caustic medium. The time of immersion of the ceramic body in the leachant will depend upon the amount and type of the metal component, and where the interconnected metal is situated with respect to the surface(s). The deeper the interconnected metal is in the first ceramic body, the longer it will take such metal to be leached or etched-out, and the longer the ceramic body will have to be left in the leachant. This extraction step may be facilitated by heating the leachant or by agitating the bath of leachant. After the first ceramic body has been removed from the leachant, it should be washed with water to remove any residual leachant.

By removing at least a portion of the metallic constituent from the formed composite body prior to formation of the protective surface layer, enhanced properties of the ceramic composite body having thereon a protective surface layer may be achieved. For example, the removal of at least a portion of the metallic constituent of the formed composite prior to formation of the protective layer may result in a stronger bond (e.g., chemical, physical, mechanical, etc.) between the composite substrate and the surface layer. Removal of the metallic constituent may tend to expose a greater surface area of the ceramic phase in the composite substrate to the atmosphere, thus providing a greater surface area to which the protective layer may chemically bond to the ceramic substrate. Moreover, by removing a portion of the metallic constituent from the composite substrate, a greater volume is available within the surface of the composite to allow formation of the protective surface layer within the composite, thus creating a mechanical bond between the substrate and the protective layer. Further, depending on the depth to which the metallic constituent is removed from the composite surface, it may be possible to form a protective layer on the ceramic substrate which is, to some extent, reinforced by the ceramic phase(s) of the ceramic substrate, thus enhancing, for example, the wear resistance of the protective layer. Moreover, by etching at least a portion of the metallic constituent of the formed composite, the dimensional surface integrity of the composite may be maintained. Specifically, upon reaction of the at least two constituents of the composite substrate to form the protective surface layer, the protective layer will tend to form within, and, to a lesser degree than without etching, beyond the surface of the formed composite to maintain the dimensional integrity of the formed composite.

In a particularly preferred embodiment, a formed ceramic composite body comprising a silicon carbide reinforced alumina may be etched in, for example, an aqueous solution comprising about 20 volume percent hydrofluoric acid and about 20 volume percent nitric acid in order to remove a majority of the metallic constituent from the surface of the composite to a desired extent. Subsequently, the etched substrate may be heated to a temperature higher than the temperature of formation of the composite substrate to allow the formation of a protective surface region on at least a portion of the surface of the composite substrate.

The protective surface region on the formed body may serve to protect the underlying ceramic composite substrate upon exposure of the formed body to environments which are harmful or detrimental (e.g., corrosive, high temperature, etc.) to the ceramic substrate. For example, upon exposure of ceramic composite bodies which do not possess a protective surface region to elevated temperatures at which at least one metallic constituent of the ceramic composite becomes molten, the ceramic composite may exhibit bleed-out of the molten metallic constituent within the ceramic composite, thus weakening the structure of the ceramic composite. Moreover, upon exposure of the molten metallic constituent of a ceramic composite to an oxidizing environment, the metallic constituent may oxidize to form oxidation reaction product of the molten metallic constituent on the surface of the ceramic composite, which may weaken the structure of the ceramic composite, as well as negatively affect the dimensional integrity of the ceramic composite. By providing a protective surface region on a ceramic composite substrate, the protective surface region may act to not only retain any molten metallic constituent within the ceramic composite substrate, thus alleviating the problem of bleed-out of molten metal but also may act to isolate the molten metallic constituent of the ceramic composite substrate from an oxidizing environment, thus inhibiting the formation of oxidation reaction product beyond the surface of the ceramic composite body.

Moreover, with respect to corrosion resistance, by providing a protective surface region on at least a portion of a ceramic composite substrate, upon exposure of the ceramic composite to an environment which may have corrosive effects on the metallic constituent of the ceramic composite substrate, the protective surface region may act to isolate the metallic constituent of the ceramic composite from the corrosive environment, thus inhibiting corrosion of the ceramic composite substrate.

A typical manufacturing or experimental set-up for the formation of a ceramic composite body is shown in FIG. 1. A parent metal ingot 10 (which may be doped, as explained in more detail below) is positioned adjacent to a permeable, unbonded mass or preform of a filler material 14, having a layer of dopant material 12 sandwiched between the parent metal ingot and the preform. The preform-metal ingot assembly is surrounded by a bed of substantially nonreactive support material 16, contained within a refractory boat 18, which act as a barrier to growth of oxidation reaction product. The system is maintained in the presence of an oxidant (e.g., a vapor phase oxidant) at a temperature, or within a temperature range, sufficient to allow formation of oxidation reaction product which embeds the permeable filler material.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and/or compounds and combinations thereof, for example, silica (as a source of oxygen), methane, ethane, propane, acetylene, ethylene, and propylene (as sources of carbon), and mixtures such as air, $H_2/H_2O$ and $CO/CO_2$ the latter two (i.e., $H2/H20$ and $CO/CO_2$) being useful in reducing the oxygen activity of the environment. Accordingly, the ceramic structure of the invention may comprise an oxidation reaction product comprising one or more of oxides, nitrides, carbides, borides and oxynitrides. More specifically, the oxidation reaction product may, for example, be one or more of aluminum oxide, aluminum nitride, silicon carbide, silicon boride, aluminum boride, titanium nitride, zirconium nitride, titanium boride, zirconium boride, titanium carbide, zirconium carbide, silicon nitride, hafnium boride and tin oxide. Although the oxidation reaction is usually described as employing a vapor-phase oxidant, either alone or in conjunction with an oxidant which is a solid or liquid under the process conditions, it should be understood that the utilization of a vapor-phase oxidant is not necessary to produce the ceramic matrix composite body. When a vapor-phase oxidant is not employed and an oxidant which is a solid or liquid under the process conditions is used, the preform need not be permeable to the surrounding atmosphere. However, the preform should still be sufficiently permeable to accommodate the development or growth of the oxidation reaction product as a matrix within the preform without substantially disturbing, upsetting, or otherwise altering the configuration or geometry of the preform.

The use of solid or liquid oxidants may create an environment within the preform more favorable to the oxidation kinetics of the parent metal than the environment outside the preform. This enhanced environment is beneficial in promoting matrix development within the preform to the boundary and minimizing overgrowth. When a solid oxidant is employed, it may be dispersed through the entire preform or through a portion of the preform adjacent to the parent metal, such as in particulate form and admixed with the preform, or it may be utilized as coatings on the particles comprising the preform. Suitable solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the preform and which is melted or decomposed at the process conditions to provide a suitable oxidant moiety. Examples of liquid oxidants as herein defined include low melting glasses.

As explained in the Commonly Owned Patent Applications and Patents, the addition of dopant materials, in conjunction with, for example, aluminum parent metal, can favorably influence the oxidation reaction process. The function or functions of the dopant material can depend upon a number of factors other than the dopant material itself. These factors include, for example, the end product desired, the particular combination of dopants when two or more dopants are used, the use of externally applied dopants in combination with an alloyed dopant, the concentration of the dopant(s), the oxidizing environment, and the process conditions.

The dopant or dopants used in conjunction with the parent metal (1) may be provided as alloying constituents of the parent metal, (2) may be applied to at least a portion of the surface of the parent metal, (3) may be added to the filler material, or any combination of techniques (1), (2) and (3) may be employed. For example, an alloyed dopant may be used in combination with an externally applied dopant. A source of the dopant may be provided by placing either a dopant powder or a rigid body of dopant in contact with at least a portion of the parent metal surface. For example, a thin sheet of silicon-containing glass can be placed upon a surface of an aluminum parent metal. When the aluminum parent metal (which may be internally doped with Mg) overlaid with the silicon-containing material is heated in an oxidizing environment (e.g., in the case of aluminum in air, between about 850° C. to about 1450° C., preferably about 900° C. to about 1350° C.), growth of the polycrystalline ceramic material occurs. In the case where the dopant is externally applied to at least a portion of the surface of the aluminum parent metal, the polycrystalline aluminum oxide structure generally grows substantially beyond the dopant layer (i.e., to beyond the depth of the applied dopant layer). In any case, one or more of the dopants may be externally applied to the parent metal surface. Additionally, any concentration deficiencies of the dopants alloyed within the parent metal may be augmented by additional concentration of the respective dopant(s) applied external to the parent metal.

Useful dopants for an aluminum parent metal, particularly with air as the oxidant, include, for example, magnesium, zinc and silicon, in combination with each other or in combination with other dopants described below. These metals, or a suitable source of the metals, may be alloyed into the aluminum-based parent metal at concentrations for each of between about 0.1-10% by weight based on the total weight of resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting alumina polycrystalline oxidation reaction product growth, from aluminum parent metal systems are, for example, germanium, tin and lead, especially when used in combination with magnesium. One or more of these other dopants, or a suitable source of them is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

In the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium and lithium, which may be used individually or in combination with one or more other dopants depending on the process conditions. Sodium and lithium may be used in very small amounts (in the parts per million range, typically about 100-200 parts per million) and each may be used alone or together, or in combination with other dopant(s). Calcium, boron, phosphorus, yttrium, and rare earth elements such as cerium, lanthanum, praseodymium, neodymium and samarium are also useful dopants, and herein again especially when used in combination with other dopants.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum based parent metal using air or oxygen as the oxidant, quantities as low as 0.00003 gram of silicon per gram of parent metal, or about 0.0001 gram of silicon per square centimeter of exposed parent metal surface, together with a second dopant source of magnesium, have been used to produce the polycrystalline ceramic growth phenomenon. It also has been found that a ceramic structure is achievable from an aluminum-silicon alloy parent metal using air or oxygen as the oxidant by using MgO as the dopant in an amount greater than about 0.0008 gram of Mg per gram of parent metal to be oxidized and greater than 0.003 gram of Mg per square centimeter of parent metal surface upon which the MgO is applied.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (e.g., the "initiation surface") in the grown ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting prior to using the polycrystalline ceramic product.

In an alternative embodiment of the invention, during growth of the polycrystalline oxidation reaction product, a different vapor-phase oxidant can be introduced. In this context, "different" should be understood as meaning having a composition which is chemically different from the composition of an initial vapor (or solid) phase oxidant. Thus, the second oxidation reaction product formed with the "different" vapor-phase oxidant will result in the formation of two ceramic bodies or phases integrally attached to each other having graded properties (e.g., a layer can be formed on a first formed ceramic composite body).

In yet another embodiment of the invention, the metallic constituent in the ceramic composite body can be tailored by changing the composition thereof. Specifically, for example, a second metal can be alloyed with or diffused into the parent metal during, for example, growth of oxidation reaction product to change favorably the composition, and thus, mechanical, electrical and/or chemical properties of the parent metal.

To assist in forming a shaped ceramic composite body, a barrier means can be used in conjunction with a filler material or a preform. Specifically, a barrier means which is suitable for use with this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to a vapor-phase oxidant, if a vapor-phase oxidant is used, while being capable of locally inhibiting, Poisoning, stopping, interfering with, preventing, or the like, continued growth of the oxidation reaction product.

It appears that one category of barrier means is that class of materials which may be substantially non-wettable by the transported molten parent metal. A barrier of this type appears to exhibit substantially little or no affinity for the molten metal, and growth is terminated or inhibited by the barrier means. Other barriers tend to react with the transported molten parent metal to inhibit further growth either by dissolving into and diluting the transported metal excessively or by forming solid reaction products (e.g., intermetallics, which obstruct the molten metal transport process). A barrier of this type may be a metal or metal alloy, including any suitable precursor thereto such as an oxide or a reducible metal compound, or a dense ceramic material. Because of the nature of the growth inhibition or obstruction process with this type of barrier, growth may extend into or somewhat beyond the barrier before growth is terminated. Nevertheless, the barrier reduces any final machining or grinding that may be required of the formed oxidation reaction product. As stated above, the barrier should preferably be permeable or porous, and therefore, when a solid, impermeable wall is used, the barrier should be opened in at least one zone or at one or both ends to permit the vapor-phase oxidant to contact the molten parent metal.

Suitable barriers particularly useful in this invention in the case of using aluminum parent metals and employing air as oxidant are calcium sulfate, calcium silicate, and tricalcium phosphate. These barriers appear to react locally with developing oxidation reaction product to form an impermeable calcium aluminate layer which locally terminates further growth of oxidation reaction product. Such barriers typically may be applied as a slurry or paste to the surfaces of a filler material bed which preferably is preshaped as a preform. The barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler material bed is especially desirable. For example, if the preform comprises alumina and the resulting ceramic comprises alumina, the barrier may be admixed with alumina particulate, desirably having a mesh size of about 20–1000. The alumina particulate may be mixed with the calcium sulfate, for example, in a ratio ranging from about 10:1 to 1:10, with the preferred ratio being about 1:1. In one embodiment of the invention, the barrier means includes an admixture of calcium sulfate (i.e. Plaster of Paris and portland cement). The portland cement may be mixed with the Plaster of Paris in a ratio of 10:1 to 1:10, with the preferred ratio of portland cement to Plaster of Paris being about 1:3. Where desired, portland cement may also be used alone as the barrier material.

Another embodiment, when using an aluminum parent metal and air as the oxidant, comprises using as a barrier Plaster of Paris admixed with silica in a stoichiometric amount, but there can be an excess of Plaster of Paris. During processing, the Plaster of Paris and silica react to form calcium silicate, which results in a particularly beneficial barrier in that it is substantially free of fissures. In still another embodiment, the Plaster of Paris is admixed with about 25–40 weight percent calcium carbonate. On heating, the calcium carbonate decomposes emitting carbon dioxide, thereby enhancing the porosity of the barrier means.

Other particularly useful barriers for aluminum-based parent metal systems include ferrous materials (e.g., a stainless steel container), chromia and other refractory oxides, which may be employed as a superimposed wall or container to the filler material bed, or as a layer to the surface of a filler material bed. Additional barriers include dense, sintered or fused ceramics such as alumina. These barriers are usually impermeable, and therefore are either specially fabricated to allow for porosity or require an open section such as an open end. The barrier means may form a friable product under the reaction conditions and can be removed as by abrading to recover the ceramic body.

The barrier means may be manufactured or produced in any suitable form, size, and shape, and preferably is permeable to the vapor-phase oxidant. The barrier means may be applied or utilized as a film, paste, slurry, pervious or impervious sheet or plate, or a reticulated or foraminous web such as a metal or ceramic screen or cloth, or a combination thereof. The barrier means also may comprise some filler and/or binder.

The size and shape of the barrier means depends on the desired shape for the ceramic product. By way of example only, if the barrier means is placed or situated at a predetermined distance from the parent metal, growth of the ceramic matrix would be locally terminated or inhibited where it encounters the barrier means. Generally, the shape of the ceramic product is the inverse of the shape of the barrier means. For example, if a concave barrier is at least partially spaced from a parent metal, the polycrystalline growth occurs within the volumetric space defined by the boundary of the concave barrier and the surface area of the parent metal. Growth terminates substantially at the concave barrier. After the barrier means is removed, a ceramic body remains having at least a convex portion defined by the concavity of the barrier means. It should be noted that with respect to a barrier means having porosity, there may be some polycrystalline material overgrowth through the interstices, although such overgrowth is severely limited or eliminated by the more effective barrier materials. In such a case, after the barrier means is removed from the grown polycrystalline ceramic body, any polycrystalline overgrowth may be removed from the ceramic body by grinding, grit blasting or the like, to produce the desired ceramic part with no remaining overgrowth of polycrystalline material. By way of a further illustration, a barrier means spaced from a parent metal, and having a cylindrical protuberance in the direction of the metal, will produce a ceramic body with a cylindrical recess inversely replicating the same diameter and depth of the cylindrical protuberance.

In order to achieve minimal or no polycrystalline material overgrowth in the formation of ceramic composites, the barrier means may be placed on, or positioned in close proximity to, the defined surface boundary of any filler material bed or preform. Disposal of the barrier means on the defined surface boundary of the bed or preform may be performed by any suitable means, such as by layering the defined surface boundary with the barrier means. Such layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, growth of the polycrystalline oxidation reaction product terminates upon reaching the defined surface boundary of the preform and contacting the barrier means.

In a preferred embodiment for manufacturing a ceramic matrix composite body, a permeable shaped preform of a filler material (described below in greater detail) is formed having at least one defined surface boundary with at least a portion of the defined surface boundary having or superimposed with the barrier means. It should be understood that the term "preform" may include an assembly of separate preforms ultimately bonded into an integral composite. The preform is placed adjacent to and in contact with one or more parent metal surfaces or a portion of a surface of the parent metal such that at least a portion of the defined surface boundary having or superimposed with the barrier means is generally positioned distantly or outwardly from the metal surface, and formation of the oxidation reaction product will occur into the preform and in a direction towards the defined surface boundary with the barrier means. The permeable preform is part of the lay-up, and upon heating in a furnace, the parent metal and the preform are exposed to or enveloped by the vapor-phase oxidant, which may be used in combination with a solid or liquid oxidant. The metal and oxidant react, and the reaction process is continued until the oxidation reaction product has infiltrated the preform and comes in contact with the defined surface boundary having or superimposed with the barrier means. Most typically, the boundaries of the preform, and of the polycrystalline matrix, substantially coincide; but individual constituents at the surfaces of the preform may be exposed or may protrude from the matrix, and therefore infiltration and embedment may not be complete in terms of completely surrounding or encapsulating the preform by the matrix. The barrier means prevents, inhibits or terminates growth upon contact with the barrier means, and substantially no overgrowth of the polycrystalline material occurs. The resulting ceramic composite product includes a preform infiltrated or embedded to its boundaries by a ceramic matrix comprising a polycrystalline material consisting essentially of the oxidation reaction product of the parent metal with the oxidant and, optionally, one or more metallic constituents such as non-oxidized constituents of the parent metal or reduced constituents of an oxidant.

Examples of filler materials useful in the invention, depending upon parent metal and oxidation systems chosen, include one or more of aluminum oxide, silicon carbide, silicon aluminum oxynitride, zirconium oxide, zirconium boride, titanium nitride, barium titanate, boron nitride, silicon nitride, ferrous alloys, e.g., iron-chromium-aluminum alloy, carbon, aluminum and mixtures thereof. However, any suitable filler material may be employed in the invention, and three specific classes of useful filler materials may be identified.

The first class of filler materials contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition, a larger number of binary, ternary, and higher order metallic compounds such as magnesium aluminate spinel, $MgO\ Al_2O_3$, are contained in this class of stable refractory compounds.

The second class of suitable filler materials are those which are not intrinsically stable in the oxidizing and high temperature environment of the process, but which, due to relatively slow kinetics of the degradation reactions, can be incorporated as a filler phase within the growing ceramic body. An example in the case of an alumina ceramic matrix is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide.

A third class of suitable filler materials are those which are not, on thermodynamic or on kinetic grounds, expected to survive the oxidizing environment or exposure to molten metal necessary for practice of the invention. Such filler mixtures can be made compatible with the process of the present invention 1) if the oxidizing environment is made less active, or 2) through the application of a coating thereto, which makes the species kinetically nonreactive in the oxidizing environment. An example of such a class of fillers would be carbon fibers of varying sizes employed in conjunction with a molten aluminum parent metal. If the aluminum is to be oxidized with air or oxygen at, for example, 1250° C., to generate a matrix incorporating the fiber, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but not to the carbon fiber.

Although prefiring of the filler material may be beneficial, it is not essential to the formation of ceramic composite bodies by the method of this invention. Specifically, non-prefired filler material may be embedded by oxidation reaction product to result in the formation of a ceramic composite body. When the composition of the filler material is harder than the surrounding matrix of oxidation reaction product, the resultant highly-loaded ceramic composite body may exhibit increased hardness, erosion resistance, etc. Further, this method may require the addition of one or more dopant materials to the growth alloy (e.g., in a preferred embodiment a silicon-containing dopant) to permit the formation of oxidation reaction product. One potential difficulty with not prefiring the filler material is the formation of aluminum carbide upon reaction of aluminum parent metal with a non-prefired silicon carbide filler material. The temperature at which the oxidation reaction is carried out and time of reaction may be used to control the formation of aluminum carbide by carrying out the oxidation reaction at temperatures below about 950° C.

In a further embodiment, it may be possible to form a ceramic matrix composite body having graded properties by varying, for example, the particle sizes, compositions, etc., of the regions of the mass or preform of filler material in a manner to obtain a desired result. Specifically, it may be possible to form a ceramic matrix composite body having in at least one portion properties which are characteristic of a ceramic composite body formed by embedding a substantially uniform mass of filler material and in at least one other portion properties which are characteristic of a ceramic composite body formed by embedding a mass of filler material comprising a filler material of varying size and/or shape. In this manner, a ceramic body may be tailored to possess enhanced properties to serve a specific need.

EXAMPLE 1

Sample A

A ceramic matrix composite body having thereon a protective surface region was formed according to the method of the present invention.

Specifically, 500 mesh (17 microns) silicon carbide particulate (39 Crystolon, Norton Co., Worcester, Mass.) was loaded into a refractory boat measuring approximately 14 inches (356 mm) × 11 inches (279 mm) × 6 inches (152 mm) which was lined with ceramic fiber paper (Fiberfrax ®, SOHIO/Carborundum Co., Niagara Falls, N.Y.) to a depth of approximately 3 inches (75 mm). The boat was placed into an air atmosphere resistance heated electric furnace and heated to about 1325° C. in about 15 hrs, held at about 1325° C. for about 24 hours and then allowed to cool to room temperature. Upon heating, part of the silicon carbide was oxidized to form silica ($SiO_2$). The silica content of the oxidized powder comprised between about 15 and 25 percent of the total weight of the powder. Comminution of the partially oxidized powder was accomplished by jaw crushing, followed by sieving until the agglomerates were broken down to about −200 mesh (80 microns), at which point the powder was ready for sediment casting.

A slurry was prepared having a composition by weight of about 74 percent silicon carbide, about 22 percent deionized water, about 2 percent Elmer's glue, about 2 percent Wesolok ® colloidal alumina (Wesbond Corporation, Wilmington, Del.), and about 0.05 percent Colloids 581B defoamer (R. T. Vanderbilt Co. Norwalk, Conn.). Specifically, the prefired silicon carbide powder was placed into a Hobart mixer (Model A200, Troy, Ohio), then the liquids were added slowly to the mixer and the slurry was allowed to mix for about 5 minutes.

A silicon rubber mold was prepared by painting the interior surface of the mold with a thin coating of ethanol and 1000 mesh (7.6 microns) silicon carbide (39 Crystolon, Norton Co., Worcester, Mass.) mixed in equal parts by weight. The rubber mold was placed onto a support plate placed upon a vibrating table.

The slurry was then slowly poured into the mold and the top surface of the slurry was leveled with a straight edge. After about an hour, the excess water appearing on the top surface of the slurry casting was removed with a sponge or paper towel. Following the daubing operation, the vibration was continued for about another 45 minutes. The preform with its mold and support plate was placed into an approximately 10° F. freezer and allowed to freeze for at least 8 hours, at which point the preform and mold were removed from the freezer and the preform was separated from the mold.

The frozen preform was immediately placed onto a bed of 90 mesh (160 microns) alumina (38 Alundum, Norton Co., Worcester, Mass.). The preform and bedding were then placed into a forced air dryer operating at between about 15° and 21° C. and allowed to dry for a minimum of 24 hours.

A refractory boat was prepared by first preparing a moldable mixture of castable powder (Castable 3000, C-E Refractories, Valley Forge, Pa.) and water in a Hobart mixer (Model A 200). This moldable mass was hand pressed into the cavity of a stainless steel mold having dimensions of about 48 inches×36 inches×6 inches tall. Sufficient material was pressed into the cavity such that the finished boat had a wall thickness of about one inch.

The boat was air dried at room temperature for at least sixteen hours, then the stainless steel mold was removed, and the dried refractory boat was placed into a resistance heated air atmosphere furnace. The furnace was ramped to about 200° C. in about 2 hours, held at about 200° C. for about 2 hours, then ramped to about 1325° C. in about 10 hours, and held at about 1325° C. for about 100 hours. The furnace was then allowed to cool to ambient temperature, and the refractory boat was removed.

FIG. 1 illustrates the lay-up in cross-section used in the present Example. The lay-up was assembled by first painting a coating 12 of Leecote LX-60 WPS slurry (Acme Resin Corp., Madison, Ohio) onto the surface of the 380M parent alloy ingot 10 (U.S. Reduction Co., Munster, Ind.). The composition of 380M is nominally the same as Aluminum Association alloy 380.1, except that the Mg content is about 0.17 to 0.18 percent. The other surfaces of the alloy ingot 10 were coated with a slurry comprising by weight about 50 percent water, about 25 percent plaster of paris (Bondex, Bondex International, Inc. St. Louis, Mo.), and about 25 percent alumina (A-17, Alcoa Co., Pittsburgh, Pa.). Both coatings were allowed to dry. Next, coarse wollastonite bedding 16 (coarse fiber-Nyad SP, Nyco Inc., Willsboro, N.Y.) was placed into the refractory boat 18 to a depth of about 1 inch (25 mm). The parent metal alloy ingot 10 was then placed on top of the bedding 16 such that the surface containing the Leecote coating 12 was exposed, and the preform 14 was then placed on top of the alloy ingot 20 such that it contacted the Leecote coating 12. The boat 18 was then filled with additional coarse wollastonite bedding 16 until all but the top surface of the preform 14 was covered.

The boat and its contents were placed into a resistance heated air atmosphere furnace, and the furnace was ramped to about 980° C. over about a 24-hour period. The temperature was held at about 980° C. for about 300 hours, after which time the furnace was cooled to about 750° C. and held at that temperature. The furnace was opened and excess parent metal alloy was drained from the lay-up. After closing the furnace, the furnace and its contents were allowed to cool to a temperature of about 45° C. or less.

The formed composite (i.e., the preform infiltrated with oxidation reaction product) was removed from the furnace and sandblasted to remove any residual adhered wollastonite and/or parent metal alloy.

A protective surface layer was then formed on the outer surface of the composite by a heat treatment process.

Specifically, dense alumina support rods (McDanel Refractory Co., Beaver Falls, Pa.) were placed on the bottom of a dense alumina boat (McDanel Refractory Co.), and the composite was placed onto the support rods. The boat was then placed into a resistance heated air atmosphere furnace, and the furnace was heated to about 1700° C. at a rate of about 500° C. per hour. The furnace was held at about 1700° C. for 1 hour, then cooled to room temperature at a rate of about 500° C. per hour. The boat was removed from the furnace and the heat treated composite was then removed from the boat.

The surface layer which had formed on the heat treated composite, identified as Sample A in Table 1, was characterized by optical microscopy and x-ray diffraction (XRD).

Figure 2:
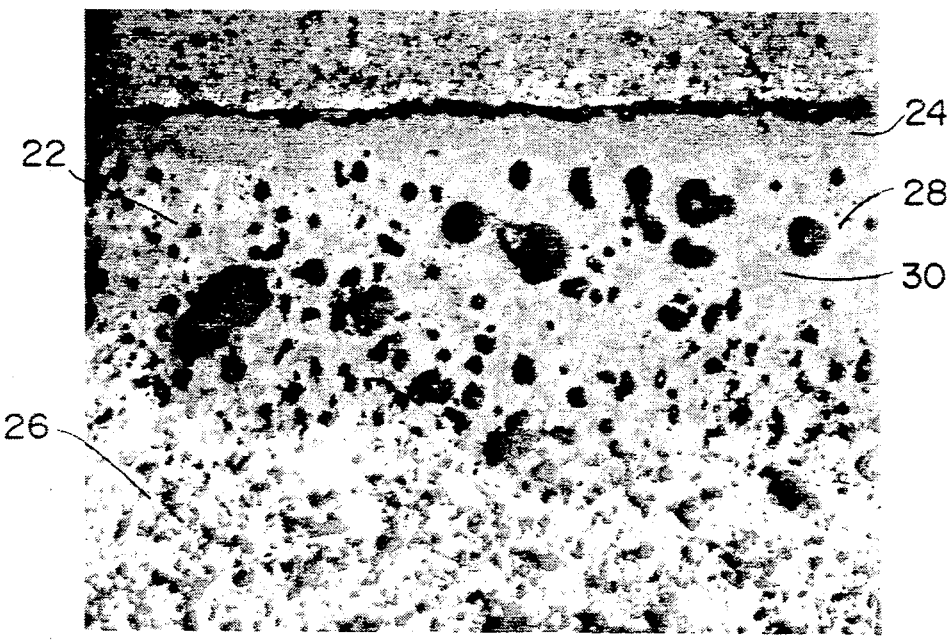
FIG. 2 is an optical photomicrograph at about 200× magnification of the ceramic matrix composite formed as Sample A in Example 1.

A photomicrograph of a cross-section of the heat treated composite at 200× magnification is shown in FIG. 2. The microstructure reveals a porous polycrystalline region 22 extending approximately 225 to 300 microns beyond an imaginary line defining the edge of the silicon carbide reinforcement particles. On top of this layer is an approximately 20 to 30 micron thick dense layer 24. These two layers are both exterior to the portion of the composite containing silicon carbide 26.

A portion of the surface layer was analyzed by x-ray diffraction. This sample was prepared by scraping or chipping off some of the surface layer and grinding it to a fine powder in a mortar and pestle. The powdered sample was placed into the sample chamber of a diffractometer (Model D500, Siemens AG, Munich, FRG) and scanned with unfiltered $Cu_{K\alpha}$ x-radiation at an energy of 40KeV. The counting time was about two seconds at each 0.030 degree interval of two-theta. Mullite ($Al_6Si_2O_{13}$) was found to be the major phase present. Alpha-alumina, silicon carbide, aluminum, and silicon were also found, but in lesser quantities.

TABLE 1

HEAT-TREATMENT TEMPERATURES AND COMPOSITION OF SURFACE LAYERS PRODUCED

| Sample | Composite | Growth Alloy | Etchant | Heat-Treatment | | | Primary Surface Layer Constituents(s) |
|---|---|---|---|---|---|---|---|
| | | | | Time (hr) | Temp (°C.) | Atm. | |
| A | 500# SiC/Al$_2$O$_3$/Al[1] | 380M | — | 1 | 1700 | Static Air | Al$_6$Si$_2$O$_{13}$ |
| B | 500# bl SiC/Al$_2$O$_3$//Al[2] | Al—6Zn—10Si | — | 0.5 | 1400 | Static Air | Al$_2$SiO$_5$, Al$_6$Si$_2$O$_{13}$ |
| C | 500# SiC/Al$_2$O$_3$/Al | 380M | — | 4 | 1300 | 78% N$_2$ 22% O$_2$ | ZnAl$_2$O$_4$, Al$_2$SiO$_5$ |
| D | 500# SiC/Al$_2$O$_3$/Al | 380M | — | 100 | 1300 | Static Air | MgAl$_2$O$_4$, ZnAl$_2$O$_4$ |
| T | 500# bl SiC/Al$_2$O$_3$/Al[2] | 380M | 20 hrs @ 900° C. under vacuum | 50 | 1100 | Static Air | MgAl$_2$O$_4$ |

[1]SiC-reinforced Al$_2$O$_3$ composite (500 mesh SiC)
[2]SiC-reinforced Al$_2$O$_3$ composite (500 mesh SiC blend: 5 wt % 500# SiC, 75 wt % 100# SiC, 20 wt % 100GL SiC)
[3]0.4 liter/minute gas flow rate Semi-quantitative analyses were also performed on the two phases identified by optical microscopy in the surface layer. This analysis was carried out using energy dispersive x-ray analysis (EDAX) feature (Model VZ15, Princeton Gamma Tech, Inc. Princeton, N.J.) on a scanning electron microscope (Model 500, Philips Gloeilampenfabriek, N.V., Eindhoven, The Netherlands) coupled to a spectrum analyzer (Tracor Northern, Inc., Middleton, Wis.). The electron microprobe detected aluminum and silicon in an atomic percent ratio in the majority phase 28 in the thicker, porous layer, suggesting mullite. Silicon was detected in the minority phase 30, suggesting silica. The crystallographic form of silica was identified as the cristobalite form, although the presence of amorphous silica and/or aluminosilicate glass(es) are not precluded.

In the dense, thin, coating layer, optical microscopy showed that the majority and minority phases were reversed.

EXAMPLE 2

To demonstrate that surface layers having varying compositions can be formed in silicon carbide reinforced composites, several additional heat treatments were performed.

Sample C

A silicon carbide reinforced ceramic matrix composite made by substantially the same method as that described in Example 1, was placed into a high density alumina boat in substantially the same manner as described in Example 1. The boat was then placed into a resistance heated air atmosphere furnace and ramped to a temperature of about 1300° C. at a rate of about 600° C. per hour. The furnace was held at about 1300° C. for about 4 hours, then cooled to room temperature at a rate of about 1200° C. per hour. The boat and its lay-up were removed from the furnace and the heat treated composite, identified in Table 1 as Sample C, was removed from the boat.

Figure 3A:
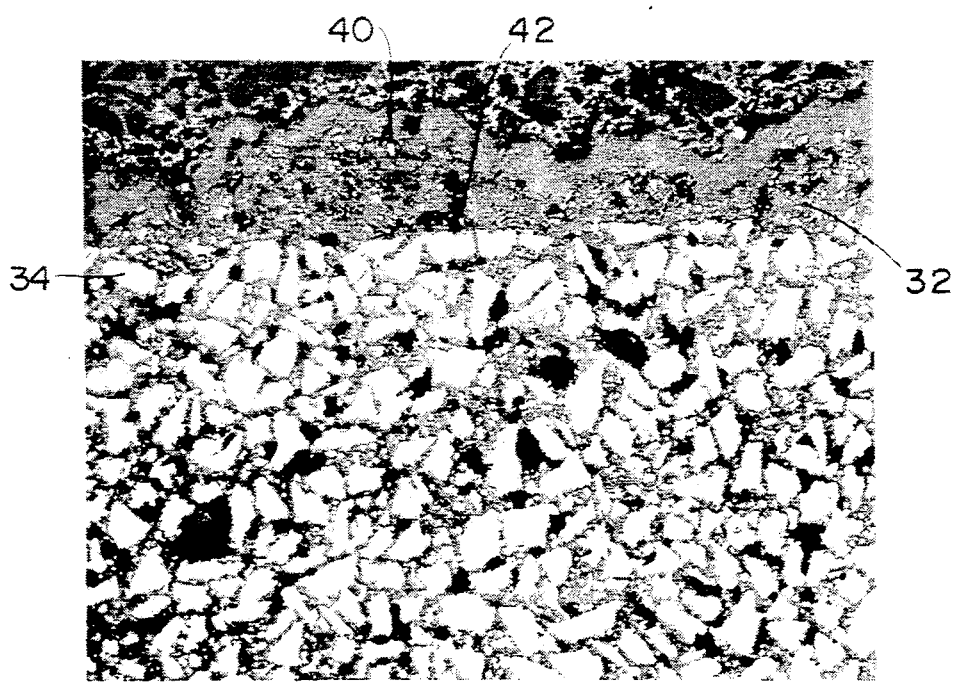
FIG. 3a is an optical photomicrograph at about 400× magnification of the SiC-reinforced ceramic matrix composite formed as Sample C in Example 2.

The surface layer formed on the heat treated composite was characterized by optical microscopy, scanning electron microscopy (SEM), and by X-ray diffraction. A 400× magnification optical photomicrograph of a cross-section of the heat treated composite is shown in FIG. 3a. The microstructure reveals a dark, irregular layer 32 at the surface of the original composite, as suggested by the boundary line of silicon carbide particles 34. The thickness of the layer ranges from approximately 25 to 50 microns.

Figure 3B:
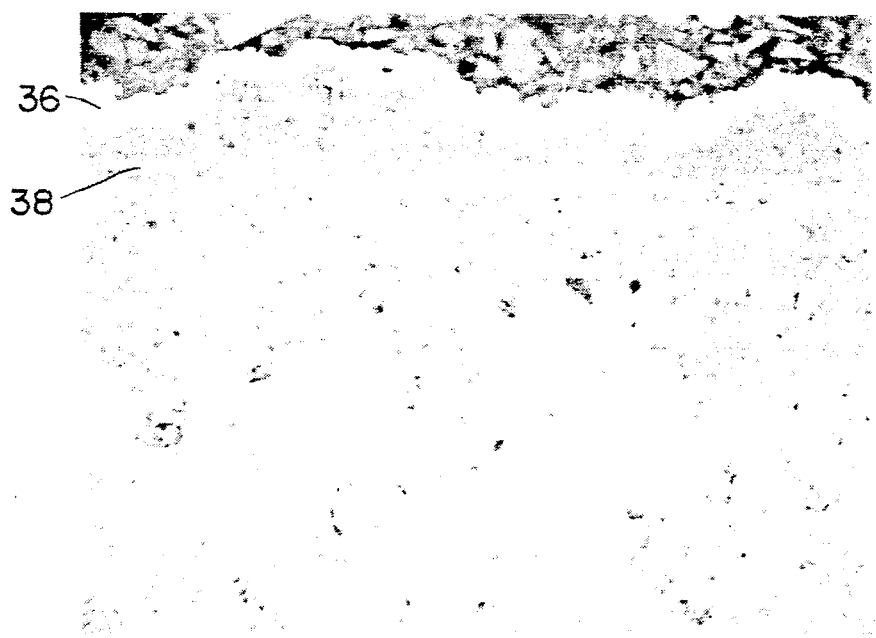
FIG. 3b is a backscattered electron photomicrograph at about 400× magnification of Sample C in Example 2.

The 400× magnification photomicrograph of FIG. 3b was taken with a scanning electron microscope using backscattered electron emission. FIG. 3b reveals that the surface layer actually comprises two layers, both of which are irregularly shaped. The outer layer 36 ranges from about 5 to 12 microns in thickness, while the inner layer 38 ranges from about 12 to 38 microns in thickness.

Upon closer inspection, the dual nature of the layer can be seen in FIG. 3a, which also shows that the inner layer contains some metal 40 and porosity 42, while the outer layer appears metal-free and dense.

Electron microprobe analysis revealed that at least aluminum and zinc were present in this dual layer, with the zinc concentrated in the outer layer. An x-ray diffraction analysis was also performed on the surface of Sample C. The monolithic composite was placed into the diffractometer's sample chamber, and the data collection was carried out in substantially the same manner as was described for Sample A. In the case of Sample C, however, the x-ray collection time was about four seconds at each angle.

The x-ray diffraction analysis indicated the presence of at least magnesium aluminate ($MgAl_2O_4$), sillimanite ($Al_2SiO_5$), alpha-alumina and silicon. Because magnesium aluminate and zinc aluminate ($ZnAl_2O_4$) have almost identical x-ray diffraction peaks, and since zinc and not magnesium was identified by electron microprobe analysis, it was concluded that the phase actually present was zinc aluminate, rather than magnesium aluminate. The zinc for the zinc aluminate coating originated in the metallic constituent of the composite.

Sample D

A silicon carbide reinforced alumina matrix composite made by substantially the same method as described in Example 1, then heat treated in substantially the same manner as described in Example 1, except that the resistance heated air atmosphere furnace was heated to a temperature of about 1300° C. at a rate of about 200° C. per hour. The furnace was held at about 1300° C. for about 100 hours, after which time it was cooled to room temperature at a rate of about 200° C. per hour.

Figure 4A:
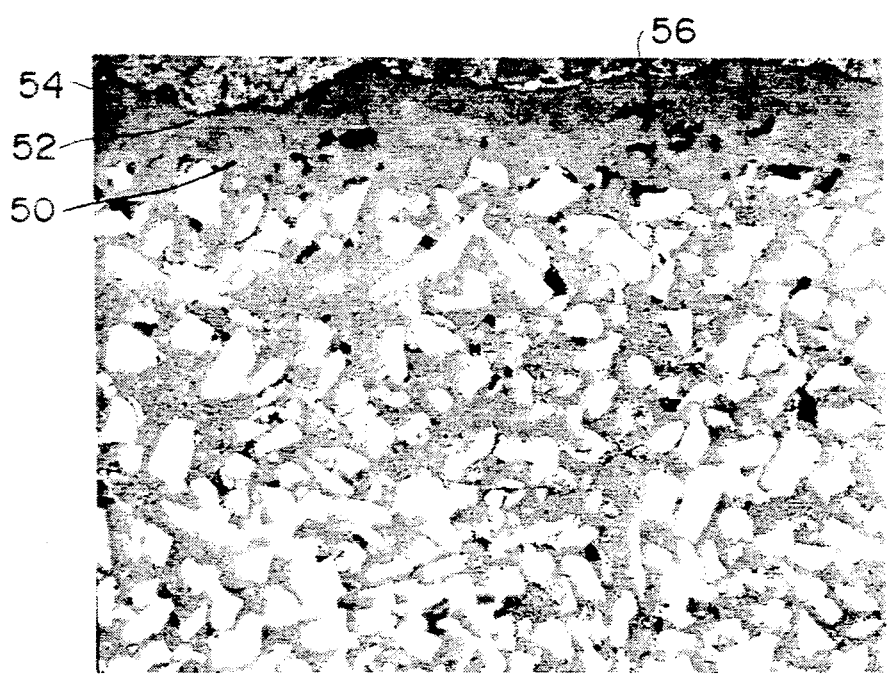
FIG. 4a is an optical photomicrograph at about 400× magnification of the SiC-reinforced ceramic matrix composite formed as Sample D in Example 2.

A 400× magnification photomicrograph of the heat treated sample, identified in Table 1 as Sample D, is shown in cross section in FIG. 4a. The microstructure reveals the presence of several phases 50, 52 and 54, exterior to the boundary defined by the edge of the silicon carbide particles. The phase 54 comprising the outermost layer, approximately 3 to 6.5 microns thick, appears continuous. Some isolated porosity 56 can be seen in the coating layers.

Figure 4B:
FIG. 4b is a scanning electromicrograph at about 2000× magnification of the surface region of Sample D in Example 2.

An x-ray distribution map was prepared on the surface layer material using the EDAX feature of the scanning electron microscope. A secondary electron image is shown in FIG. 4b. An x-ray distribution analysis indicated the presence of magnesium and aluminum in the surface layer overlying one another. The distribution analysis map also revealed presence of calcium and zinc. The source of the magnesium and zinc is the metallic constituent in the composite, and the calcium is believed to derive from the barrier material used to confine the growth process to the preform boundaries.

Sample B

A blended silicon carbide reinforced ceramic matrix composite was made by first preparing a 72 weight percent solids silicon carbide slip. Into a 1 gallon Nalgene ® (Nalge Co., Rochester, N.Y.) container were placed about 1400 grams of deionized water, about 1 gram of Darvan 821A (R. T. Vanderbilt Co., Norwalk, Conn.), about 2000 grams of ½ inch (13 mm) diameter by ½ inch (13 mm) tall Burundum ® cylindrical grinding media (U.S. Stoneware, Mahwah, N.J.), about 720 grams of 100 GL (0.6 micron) silicon carbide (Grade 059, Superior Graphite Co., Chicago, Ill.), about 180 grams of 500 mesh (17 micron) prefired silicon carbide (39 Crystolon, Norton Co., Worcester, Mass.), and about 2700 grams of 1000 mesh (6 micron) prefired silicon carbide (Exolon-ESK, Tonawanda, N.Y.).

The slip was milled for about 48 hours, after which time the grinding media were removed and the slip was milled for about an additional 24 hours. (The 500 mesh (17 micron) silicon carbide powder was prefired essentially according to the technique outlined in Example 1, and the 1000 mesh (6 micron) silicon carbide was prefired in essentially the same manner, except that the furnace schedule was modified so that the firing consisted of an approximately 3 ½ hour soak at a temperature of about 1250° C. to produce a silica content of about 18 weight percent.)

A two piece plaster mold having an internal cavity measuring approximately 3 ⅛ inches (79 mm) by 3 ⅛ inches (79 mm) by ⅜ inch thick (10 mm) was moistened slightly with water, assembled and held together with rubber bands.

The slip was deaired to about 30 inches (760 mm) of vacuum in a vacuum chamber (Super VacMac Model #160-015 Swest,Dallas, Tex.) for about 5 minutes and the slip viscosity was measured using a Model RVT Brookfield Viscosimeter (Brookfield Engineering Laboratories, Inc., Stoughton, Mass.) with a number 4 spindle. The acceptable viscosity ranged between about 50 and 100 cP.

The slip was then cast into the mold cavity, pouring slowing down the side of the mold to avoid trapping air in the slip. Approximately 30 minutes were required for the slip cast to fill the entire mold cavity.

After casting, the preform was removed from the mold and allowed to dry. on a drying rack for at least 12 hours under ambient conditions, then placed into a drying oven at about 40° C. for at least 6 hours.

The cast and dried preform was then sanded with sandpaper to provide clean, smooth surfaces free of casting mold lines, then placed on top of slotted firebricks and loaded into a room temperature resistance heated air atmosphere furnace. The furnace was heated to about 1025° C. over an approximately 8 hour period, held at about 1025° C. for about 24 hours and then cooled to room temperature with the power off.

The prefired preform was then coated on five sides with a slurry comprising about 50 weight percent fine wollastonite (Nyco Corp., Willsboro, N.Y.) and 50 weight percent YK thinner (ZYP Coatings, Oak Ridge, Tenn.) which had been roll mixed for about 2 hours, and which when dry, served as a barrier during the growth process.

The uncoated side of the preform was coated with a slurry comprising about 90 weight percent −325 mesh (less than 45 micron) silicon metal powder (Atlantic Equipment Engineers, Bergenfield, N.J.) in ethanol. The coatings were dried for at least 6 hours in a forced air drying oven at a temperature of about 40° C.

The parent metal or growth alloy (composition is listed in the Tables) was polished to remove any oxide on the surface of the ingot. For growth of 3 ⅛ inch (79 mm) by 3 ⅛ inch (79 mm) by ⅜ inch (10 mm) thick preforms, the size of the parent metal alloy ingot was about 9 inches (229 mm) by 9 inches (229 mm) by 1 inch (25 mm), with four preforms growing from one ingot. (For simplicity, only a single preform is referred to in the procedural discussion.)

The furnace lay-up was prepared by first placing coarse wollastonite bedding material (coarse fiber-Nyad SP, Nyco Corp., Willsboro, N.Y.) in a refractory boat to a depth of about 1 inch (25 mm). The alloy ingot was then placed onto the wollastonite bedding with the polished surface facing up. The dried preform was placed on top of the alloy ingot with the silicon metal coating facing down. Additional coarse wollastonite was then placed into the refractory boat to a level flush with the top of the preform. The lay-up was then placed into a resistance heated air atmosphere furnace at room temperature.

The furnace was heated to a temperature of about 940° C. over a period of about 8 hours. It was held at about 940° C. for about 100 hours, then the furnace was cooled to about 750° C. over a period of about 2 hours. The furnace door was opened and the formed composite was removed from the parent metal alloy pool and set to the side on the bedding of coarse wollastonite. The furnace door was closed and the furnace was allowed to cool to room temperature. The formed composite was then sandblasted to remove any residual metal or barrier material adhered to its exterior.

The formed composite was placed horizontally onto a slab of reticulated alumina (Hi-Tech Ceramics, Alfred, N.Y.), and this assembly was placed into a resistance heated air atmosphere furnace. The furnace was ramped to a temperature of about 1400°0 C. in a period of about 4 hours, then held for about 30 minutes at about 1400° C., then the power was turned off and the furnace was allowed to cool to room temperature. The heat treated composite was removed for analysis.

Figure 5:
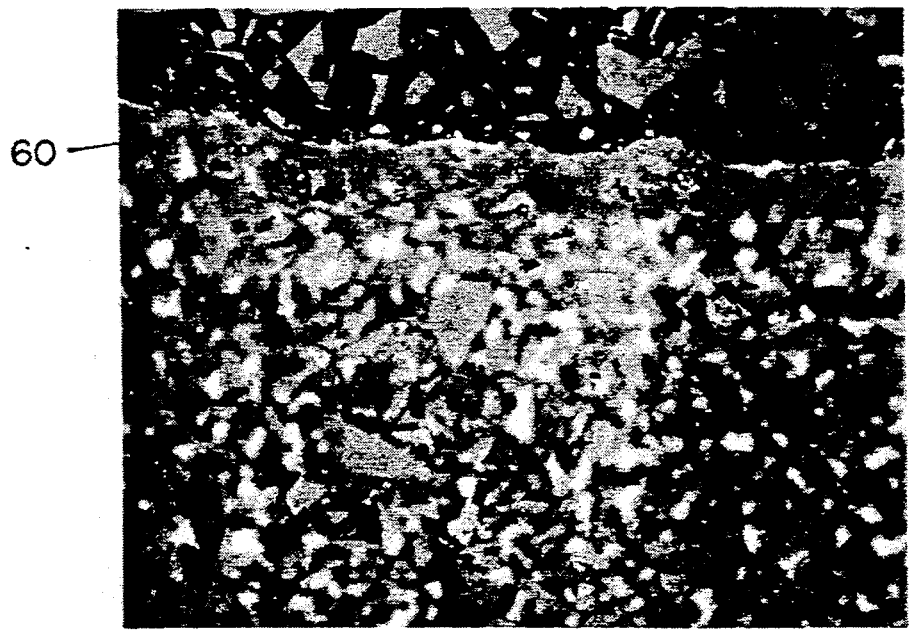
FIG. 5 is a scanning electron photomicrograph at about 1000× magnification of the ceramic matrix composite formed as Sample B in Example 5.

A cross-section of the heat treated composite, identified in Table 1 as Sample B, was mounted and polished. FIG. 5 shows an approximately 1000× magnification scanning electron photomicrograph of the polished cross-section. The photomicrograph reveals a dense surface layer 60 extending about 5-12 microns beyond the edge of the silicon carbide particles.

A sample of the heat treated composite which contained a portion of the surface layer material was removed for x-ray diffraction analysis. The sample was placed into the sample chamber of the XRD unit and was scanned with x-radiation substantially according to the technique outlined in Example 1. The analysis revealed the presence of mullite, sillimanite ($Al_2SiO_5$), alpha-alumina, aluminum, silicon and silicon carbide. Because of the noncoherent nature of this particular surface layer, some of the original composite materials, namely the alpha-alumina, silicon carbide, aluminum and silicon, were still exposed after formation of the surface layer and were, therefore, detected by the x-ray diffractometer.

The runs cited above illustrate that various surfaces can be formed on ceramic composites and that the composition of the surfaces so formed may depend upon both the time and temperature of heat treatment.

EXAMPLE 3

Samples E, F, G, H, I and CC

Silicon carbide reinforced ceramic matrix composite bodies identified as Samples E, F, G, H, I and CC were made by substantially the same technique described in Example 2 for Sample B, except that the parent metal alloy used to make Samples F, G, and H comprised 380M, and the alloy used for Sample I comprised Al-6Zn-20Si. Sample E was made by substantially the same technique used to make Sample B.

With the exception of Samples I and CC which were not etched, the formed silicon carbide reinforced ceramic matrix composites were then acid etched prior to the heat treatment. The etching treatment comprised an approximately 30 minute soak at room temperature in an aqueous solution of about 20 volume percent hydrofluoric acid and about 20 volume percent nitric acid.

The samples were then placed onto a slab of reticulated alumina (Hi-Tech Ceramics, Alfred, N.Y.) and this assembly was placed into a resistance heated air atmosphere furnace.

In all cases except for Samples I and CC, the composites were ramped to the heat treatment temperature in about 4 hours. For Samples I and CC the ramp times were 8 and 6 hours, respectively. The heat treatment times and soak temperatures are listed in Table 2. After heat treatment of each sample, the power to the furnace was turned off and the furnace was allowed to cool to room temperature.

EXAMPLE 4

Table 3 illustrates that a variety of silicon carbide reinforced ceramic matrix composites may be heat treated in an oxidizing atmosphere to produce a protec-

TABLE 2

HEAT-TREATMENT TIMES TO PRODUCE PROTECTIVE SURFACE LAYER

| Sample | Composite | Growth Alloy | Etchant | Heat Treatment | | | Thickness of Protective Surface Layer ($\mu$m) | |
|---|---|---|---|---|---|---|---|---|
| | | | | Time (hrs) | Temp (°C.) | Atm. | Outside SiC Reinforcement | Within SiC Reinforcement |
| E | 500# bl SiC/ $Al_2O_3/Al^2$ | Al—6Zn—10Si | 2 hrs in 20% HF/20% $HNO_3$ soln. | 0.5 | 1400 | Static Air | <10 | 75 |
| F | 500# bl SiC/ $Al_2O_3/Al^2$ | 380M | 30 minutes in above soln. | 2 | 1400 | Static Air | 13 | 12–32 |
| G | 500# bl SiC/ $Al_2O_3/Al^2$ | 380M | 30 minutes in above soln. | 10 | 1400 | Static Air | 13 | 36 |
| H | 500# bl SiC/ $Al_2O_3/Al^2$ | 380M | 30 minutes in above soln. | 20 | 1400 | Static Air | 20 | 30 |
| I | 500# bl SiC/ $Al_2O_3/Al^2$ | Al—6Zn—20Si | — | 100 | 1500 | Static Air | 20–60 | 0–40 |
| CC | 500# bl SiC/ $Al_2O_3/Al^2$ | Al—6Zn—10Si | — | 50 | 1400° C. | Static Air | 85–120 | — |

[1]SiC-reinforced $Al_2O_3$ composite (500 mesh SiC blend)

Because the etching treatment removed a portion of the metallic constituent near the surface of the composite, some of the coating subsequently produced extended into the interior of the composite, (i.e., beyond the outer edge of the silicon carbide particle reinforcement phase. Accordingly, the thickness of both the layer extending into the silicon carbide phase and the layer which is outside of the silicon carbide phase are recorded in Tables 2 and 4.

Samples F, G, and H indicate the effect of increased heat treatment time on the resulting protective surface layer thickness. The surface layer thickness outside of the silicon carbide reinforcement region measured about 13, 13, and 20 microns for heat treatment times of about 2, 10, and 20 hours, corresponding to Samples F, G and H, respectively.

Sample CC

A blended silicon carbide reinforced ceramic matrix composite body was formed in a manner substantially identical to the method of Sample B, described above. The formed composite was then placed horizontally onto a slab of reticulated alumina (Hi-Tech Ceramics, Alfred, N.Y.), and this assembly was placed into a resistance heated air atmosphere furnace. The furnace was ramped to a temperature of about 1400° C. in about 6 hours, then held for about 50 hours at about 1400° C., then the power was turned off and the furnace was allowed to cool to room temperature. The heat treated composite was removed for analysis.

Figure 5A:
FIG. 5a is an optical photomicrograph at about 400× magnification of the ceramic matrix composite body formed as Sample CC in Example 2.

A cross-section of the heat treated composite, identified in Table 2 as Sample CC, was mounted and polished. FIG. 5a shows an approximately 400× magnification optical photomicrograph of the polished cross-section. The photomicrograph reveals a dense surface layer extending about 85–120 microns beyond the edge of the silicon carbide particles.

This example demonstrates that protective surface layers for ceramic matrix composites can be formed by a heat treatment process, with varying heat treatment times.

tive surface region on the composite.

Sample K

Sample K was prepared in a manner substantially identical to the method used to form the ceramic matrix composite body of Sample A in Example 1.

Samples J2 and M

The ceramic matrix composite bodies of Samples J2 and M were prepared in a manner substantially identical to the method used to form the ceramic matrix composite body of Sample B in Example 2. Sample J2 was then given an acid etch as described in Example 6. Sample M was not given any such acid etch. However, prior to the heat treatment to form a protective surface layer, Sample M was first treated to modify the composition of the metallic constituent of the formed composite.

A refractory boat made from a castable refractory mix (Castable 3000) in substantially the same manner used to make the boat in Example 1, measuring about 28 inches (711 mm) by 13 ½ inches (343 mm) by 6 inches (152 mm) tall, was filled with coarse wollastonite particulate to a depth of about 1 inch (25 mm). A second refractory boat made of a different castable refractory mix (Castolast A-L) but by substantially the same technique used to make the boat in Example 4, measuring about 6 inches (152 mm) square by about 4 inches (102 mm) tall, was placed into the first boat but off to one end. A sheet of ceramic paper (Fiberfrax ®) measuring about 12 inches (305 mm) square was placed on top of the wollastonite particulate at the opposite end of the large refractory boat. The formed composite, Sample M, was placed on top of the ceramic paper. A second approximately 12 inch (305 mm) square sheet of ceramic paper was placed on top of the formed composite. This set up, comprising the large boat and its contents, was placed into a resistance heated air atmosphere furnace and heated to about 800° C. in about 5 hours. Once the furnace had reached about 800° C., the furnace was opened and about 2.5 kilograms of molten alloy comprising about 71 weight percent nickel (Hickman Williams, Bluebell, Pa.) and 29 weight percent silicon (Elkem Metals, Marietta, Ohio) was poured into the smaller boat. The top sheet of ceramic paper was removed and the composite was then placed on top of the molten alloy pool. Graphite powder (Grade ATJ, Graphite Engineering and Sales, Greenville, Mich.) was poured on top of the composite and the alloy pool, covering each to a depth of about ½ inch (13 mm). The furnace was closed and heated to about 1100° C. in about 2 hours. The furnace was held at about 1100° C. for about 48 hours, then cooled to about 1000° C. in about ½ hour. At about 1000° C., the furnace was opened and the modified composite was retrieved from the small boat containing the alloy pool and graphite powder. The modified composite was again placed onto the bottom sheet of ceramic paper and the top sheet was placed over the composite. The furnace was closed and, with the power turned off, allowed to cool to room temperature. After retrieving Sample M from the furnace, the treated composite was sandblasted to remove any adhered modifying alloy or graphite.

Sample M was then heat treated to form a surface coating thereon. Specifically, the sample was placed onto a slab of reticulated alumina (Hi-Tech Ceramics, Alfred, N.Y.) and placed into a resistance heated air atmosphere furnace. The furnace and its contents were then heated to a temperature of about 1350° C. over a period of about 6 hours at an approximately uniform heating rate. After maintaining a temperature of about 1350° C. for about 2 hours, power to the furnace was interrupted, and the sample was allowed to cool to room temperature.

Sample R

A blended filler material comprising about 55 weight percent 220 mesh (75 micron) silicon carbide (39 Crystolon, Norton Co., Worcester, Mass.) of about 5 weight percent 280 mesh (51 micron) silicon carbide (Exolon-ESK, Tonawanda, NY) and about 40 weight percent 800 mesh (10 micron) silicon carbide (Exolon-ESK, Tonawanda, N.Y.) was prepared by first roll mixing the constituent silicon carbide powders for about 5 or 10 minutes in a Nalgene ® jar. The blended powders were then placed into the mixing chamber of a muller mixer (Model 02, Cincinnati Muller Div., National Engineering Co., Chicago, Ill.) and the powders were mixed for about 1 minute. An aqueous solution comprising about 40 weight percent DOW XUS 40303.00 Experimental Binder (Dow Chemical Co., Midland, Mich.) and about 10 weight percent DOW E400 polyglycol plasticizer (Dow Chemical Col.) was then added to the powder in the mixing chamber to form a press mix and the resulting press mix was mixed for an additional 20 to 30 minutes.

The press mix was then dried somewhat, such that the press mix after this partial drying comprised by weight about 2 percent binder, 0.5 percent plasticizer, about 0.4 percent water and the balance silicon carbide powder. The semi-dried press mix was then passed through a 20 mesh screen to break down the larger agglomerates.

The press mix was loaded into a pressing die having inner dimensions of about 4 inches (102 mm) by 4 inches (102 mm) by ¾ inch (19 mm) thick, which was then placed onto the bottom platen of a 100 ton hydraulic press (Fred S. Carver, Inc., Menomenee Falls, Wis.) in a floating die arrangement. The pressure was increased uniformly to about 10,000 psi and held at that pressure for about 20 seconds. The pressure was relieved slowly and uniformly, and the pressed preform was ejected. The green density of the pressed preform was about 2.08 grams/cubic-centimeter.

The top and four sides of the preform were then painted with a slurry comprising about 35 weight percent fine wollastonite powder in ethanol. The bottom of the preform was painted with a slurry comprising about 90 weight percent silicon metal in ethanol. The pressed component was then placed onto a bed of foundry sand which had been placed onto an aluminum plate about ¼ inch (6 mm) thick. The assembly was placed into a forced air drying oven and dried for at least 16 hours at a temperature of about 50° C.

The pressed and coated preform was processed to form a ceramic composite body by substantially the same procedure outlined for the Samples produced in Example 3, with the exception that the furnace was ramped up at a rate of about 50° C./hour to about 350° C., then immediately ramped to about 500° C. at a rate of about 20° C./hour, then immediately ramped to a temperature of about 1000° C. at a rate of about 100° C./hour, and held at about 1000° C. for about 187 hours. The parent metal used was a 380M alloy containing an additional approximately 5 weight percent silicon metal.

The formed composite was sandblasted to remove any adhered metal and/or barrier material, then sliced into rectangular shaped specimens each weighing between 3 and 7 grams.

The samples were etched for about 40 minutes in a room temperature aqueous solution comprising about 20 volume percent hydrofluoric acid and 20 volume percent nitric acid in order to remove a majority of the metallic constituent from the surface of the sample to a depth of about 30 microns into the composite.

The etched samples were placed on top of mullite foam (Hi-Tech Ceramics, Alfred, N.Y.) monoliths measuring about 10 inches (254 mm)×5 inches (127 mm)×1 inch (25 mm), and the set-up was placed into a resistance heated static air atmosphere furnace. The furnace was ramped to a temperature of about 1300° C. over a period of about 4 hours, held at about 1300° C. for about 20 hours, and then cooled to room temperature with the power turned off.

Figure 6:
FIG. 6 is an optical photomicrograph at about 400× magnification of the ceramic matrix composite formed as Sample R in Example 4.

An optical photomicrograph of the cross-section of this heat treated composite, identified in Table 3 as Sample R, is shown in FIG. 6 at about 400× magnification. This Figure shows that an approximately 10–15 micron thick layer 62 had formed at the outer boundary of the original composite material 64. Furthermore, substantially no metal channels or pockets are observable within approximately 40 microns of the edge of the composite.

TABLE 3

| | COMPOSITE SUBSTRATES USED IN PRODUCING PROTECTIVE LAYERS | | | | | |
|---|---|---|---|---|---|---|
| | | Growth | | Heat Treatment | | |
| Sample | Composite | Alloy | Etchant | Time (hrs) | Temp (°C.) | Atm. |
| J2 | 500# bl SiC/ Al$_2$O$_3$/Al$^2$ | Al—6Zn—10Si | 30 minutes in 20% HF/ | 0.5 | 1400 | Static Air |

TABLE 3-continued

COMPOSITE SUBSTRATES USED IN PRODUCING PROTECTIVE LAYERS

| Sample | Composite | Growth Alloy | Etchant | Heat Treatment Time (hrs) | Temp (°C.) | Atm. |
|---|---|---|---|---|---|---|
| K | 500# SiC/ Al$_2$O$_3$/Al[1] | 380M | 20% HNO$_3$ Solution None | 1 | 1550 | Static Air |
| L | 500# SiC/ Al$_2$O$_3$/Al[4] | Al—6Zn—10Si | Forming gas (N$_2$-4% H$_2$) | 0.5 | 1400 | Static Air |
| M | 500# bl SiC/ Al$_2$O$_3$/Al[2,5] | 380M | None | 2 | 1350 | Static Air |
| R | 220# SiC/ Al$_2$O$_3$/Al[6] | 380M + 5Si | 40 minutes in 20% HF/ 20% HNO$_3$ solution | 20 | 1300 | Static Air |

[1]SiC-reinforced Al$_2$O$_3$ composite (500 mesh SiC)
[2]SiC-reinforced Al$_2$O$_3$ composite (500 mesh SiC blend: 5 wt % 500# SiC, 75 wt % 1000# SiC, 20 wt % 100GL SiC)
[4]Post growth treated in N$_2$-4% H$_2$ (forming gas)
[5]Post growth treated in 71Ni—29Si alloy
[6]SiC-reinforced Al$_2$O$_3$ composite (220 mesh SiC blend: 55 wt % 220# SiC, 5 wt % 280# SiC, 40 wt % 800# SiC)

Sample L

The ceramic matrix composite of Sample L, made in a manner substantially identical to the technique outlined for Sample A in Example 1, was exposed to a forming gas atmosphere prior to the heat treatment.

Specifically, a refractory boat and its cover were prepared in a manner substantially identical to the process used to make the refractory boat described in Example 1, except that the raw material to make the boat and cover comprised Castolast® A-L (Harbison-Walker Refractories Group, Dresser Industries, Inc., Pittsburg, Pa.) castable refractory mixed with water, and the refractory boat and cover were fired in a resistant heated air atmosphere furnace which was ramped to about 121° C. in about 8 hours, then held at about 121° C. for about 24 hours, ramped from about 121° C. to about 260° C. in about 8 hours, held at about 260° C. for about 5 hours, then ramped from about 260° C. to about 540° C. in about 20 hours, held at about 540° C. for about 10 hours, then ramped from about 540° C. to about 900° C. in about 21 hours, held at about 900° C. for about 5 hours, then ramped from about 900° C. to about 1100° C. in about 16 hours, held at 1100° C. for about 6 hours, then ramped down to room temperature in about 10 hours.

The formed composite, measuring approximately one inch (25 mm) on each side and weighing about 17 grams, was placed into the refractory boat described above. The top cover, which had been lined with a Fiberfrax® (Sohio, McNeil Refractories, Easton, Pa.) gasket, was placed on top of the boat and the boat was placed into a resistance heated air atmosphere furnace. A refractory tube (McDanel Refractory Co., Beaver Falls, Pa.) was inserted through the top cover of the boat and extended out through the top of the furnace to provide a forming gas atmosphere within the refractory boat. The forming gas, comprising a mixture of about 4 percent hydrogen, balance nitrogen, was flowed into the furnace at a rate of about 0.5 liter/minute.

The furnace door was closed and the furnace was ramped to about 1100° C. over a period of about 16 hours. After about one hour at about 1100° C., the power to the furnace was turned off and the furnace was allowed to cool to room temperature. Upon removing the composite from the furnace, it appeared visually that a majority of the metallic constituent at the surface of the composite had been removed.

The composite was then placed upon an alumina foam material (Hi-Tech Ceramics, Alfred, N.Y.) measuring about 10 inches (254 mm) by about 5 inches (127 mm) by about 1 inch (25 mm), which in turn was placed into a resistance heated static air atmosphere furnace. The furnace was ramped to about 1400° C. in about 4 hours, held at about 1400° C. for about 30 minutes, then the power was turned off and the furnace was allowed to cool to room temperature. This heat treated composite is identified in Table 3 as Sample L.

Figure 7:
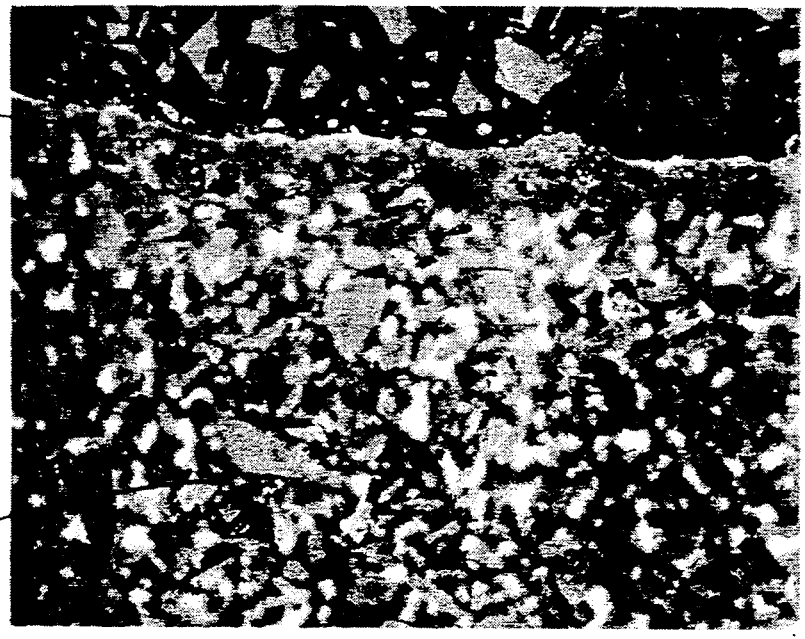
FIG. 7 is a scanning electron photomicrograph at about 400× magnification of the ceramic matrix composite formed as Sample L in Example 4.

A scanning electron photomicrograph taken at about 400× magnification of the heat treated composite sample is shown in cross-section in FIG. 7. The microstructure indicates the formation of an approximately 5 to 15 micron thick layer 66 on the surface of the composite 68.

This Example demonstrates that a surface layer can be produced on a variety of reinforced composites.

EXAMPLE 5

To demonstrate that a protective layer can be deposited within the boundaries of a formed composite, in addition to depositing the protective layer external to the original boundaries, a series of runs were carried out employing various etchants to remove at least a portion of the metallic constituent of the composite in the regions adjacent to the surface of the composite.

Table 4 sets forth the etching techniques used to etch the composites between the formation step and the heat treatment step to remove at least a portion of the metallic constituent.

Samples P, Q and S

Samples P, Q, and S were fabricated in a manner substantially identical to that described for Sample R in Example 4, except that the parent metal was an aluminum alloy designated 380M, as discussed above, with an additional approximately 5 weight percent of silicon metal. As well, the duration of etching for each composite varied, as shown in Table 4.

Following the etching process, each sample was heat treated at a temperature of about 1300° C. for about 20 hours in a resistance heated static air atmosphere furnace to form a protective surface layer. The set up and furnace temperature schedule were substantially identical to that described for Sample R in Example 4.

Following the heat treatment to form a protective layer on the composites, the samples were sectioned, mounted and polished for microscopic examination. The surfaces of the formed composites had a dense layer extending beyond the boundary of silicon carbide particles. These layers appeared to be substantially free of metal, well bonded to the underlying ceramic composite, and at least partially crystalline.

Extending down into the silicon carbide reinforced portion of the composite was a dense inner layer virtually free of metal. This inner layer varied in thickness depending on the duration of the etching treatment, as shown in Table 4.

nated Sample T, was then given a thermal etching treatment under vacuum for the purpose of removing some of the composite's metallic constituent prior to forming the protective surface layer.

A set up for a vacuum thermal etching treatment was prepared by first pouring powdered graphite (Grade KS10, Lonza, Inc., Fair Lawn, N.J.) into a dense alumina boat (McDanel Refractory Co.) measuring about 4 inches (102 mm) by about 2 inches (51 mm) by about 1 ½ inches (38 mm) tall to a depth of about ½ inch (13 mm). The composite was placed onto the graphite powder

TABLE 4
EFFECT OF ETCHING ON THICKNESS AND LOCATION OF PROTECTIVE LAYER

| Sample | Composite | Growth Alloy | Etchant | Heat Treatment Time (hrs) | Temp (°C.) | Atm. | Thickness of Protective Layer (μm) Outside SiC Reinforcement | Within SiC Reinforcement |
|---|---|---|---|---|---|---|---|---|
| B | 500# bl SiC/ Al$_2$O$_3$/Al$^2$ | Al—6Zn—10Si | None | 0.5 | 1400 | Static Air | 5–12 | 0 |
| O | 500# bl SiC/ Al$_2$O$_3$/Al$^2$ | 380M | 10 minutes in 5% HF/ 5% HNO$_3$ Solution | 1 | 1200 | Static Air | <5 | 22–30 |
| P | 220# SiC/ Al$_2$O$_3$/Al$^6$ | 380M + 5Si | 10 minutes in 20% HF/ 20% HNO$_3$ Solution | 20 | 1300 | Static Air | 7.5–10 | 5–10 |
| Q | 220# SiC/ Al$_2$O$_3$/Al$^6$ | 380M + 5Si | 20 minutes in above Solution | 20 | 1300 | Static Air | 6–14 | 10–17 |
| R | 220# SiC/ Al$_2$O$_3$/Al$^6$ | 380M + 5Si | 40 minutes in above Solution | 20 | 1300 | Static Air | 7.5–12 | 10–20 |
| S | 220# SiC/ Al$_2$O$_3$/Al$^6$ | 380M + 5Si | 60 minutes in above Solution | 20 | 1300 | Static Air | 7.5–10 | 20–32 |
| T | 500# bl SiC/ Al$_2$O$_3$/Al$^2$ | 380M | 20 hrs @ 900° C. under vacuum | 50 | 1100 | Static Air | 6–10[7] | 0 |
| U | 500# bl SiC/ Al$_2$O$_3$/Al$^2$ | Al—6Zn—20Si | 96% N$_2$-4% H$_2$ (forming gas) | 0.5 | 1400 | Static Air | 5–15 | 0 |
| E | 500# bl SiC/ Al$_2$O$_3$/Al$^2$ | Al—6Zn—10Si | 120 minutes in 20% HF/ 20% HNO$_3$ Solution | 0.5 | 1400 | Static Air | <10 | 75 |

[2] SiC-reinforced Al$_2$O$_3$ composite (500 mesh SiC blend: 5 wt % 500# SiC, 75 wt % 1000# SiC, 20 wt % 100GL SiC)
[6] SiC-reinforced Al$_2$O$_3$ composite (220 mesh SiC blend: 55 wt % 220# SiC, 5 wt % 280# SiC, 40 wt % 800# SiC)
[7] Coating comprised MgAl$_2$O$_4$ and CaAl$_2$O$_4$.

Sample U

A silicon carbide reinforced ceramic matrix composite was formed in a manner substantially identical to the technique used to form Sample I in Example 3.

The composite, designated Sample U, was then exposed to a forming gas atmosphere to remove a portion of the composite's metallic constituent. The forming gas etching process was substantially the same as that used for Sample L in Example 4.

After etching, Sample U was heat treated following a procedure substantially identical to that of Sample B in Example 2 to form the protective surface layer. Optical microscopy of a polished cross-section showed the presence of an approximately 5 to 15 micron thick coating on the surface of the composite, but not extending down into the portion of the composite reinforced with silicon carbide.

Sample T

A silicon carbide reinforced ceramic matrix composite was formed by essentially the same technique used to form Sample F in Example 3. The composite, desigand covered to a depth of about ½ inch (13mm) with additional graphite powder.

This set up was then placed into a mullite retort which extended out from the inside of a resistance heated air atmosphere furnace. The open end of the retort was then connected to a roughing pump (Duoseal Vacuum Pump, Sargent Welch Inc., Skokie, Ill.) and the retort was pumped down to a pressure of about 40 millitorr. The furnace was turned on and heated to a temperature of about 900° C. in about 9 hours. The furnace was held at about 900° C. for about 20 hours, after which it was cooled to room temperature in about 24 hours. The retort was brought back to atmospheric pressure and the composite was recovered from the boat. The weight loss of the composite was recorded, and based upon weight loss, thermodynamic, and kinetic considerations, it was estimated that about 91 percent of the zinc and about 23 percent of the magnesium in the metallic constituent of the composite had been removed by volatilization.

Sample T was then heat treated in air to form a protective surface layer. The heat treatment procedure was substantially the same as that of Sample B in Example 2, except that the sample was held at about 1100° C. for about 50 hours instead of at about 1400° C. for about ½ hour. After the furnace had cooled to room temperature, the sample was retrieved from the furnace and sectioned with a diamond saw, then mounted and polished for optical and scanning electron microscopy.

Optical microscopy revealed an approximately 6 to 10 micron thick coating on the surface of the composite. EDAX revealed the presence of magnesium, calcium and aluminum in the coating. Based upon EDAX results and thermodynamic considerations, it was determined that the surface layer comprised magnesium aluminate and calcium aluminate.

Sample O

A silicon carbide reinforced ceramic composite was made by substantially the same technique set forth for Sample T. The formed composite, designated Sample O, was etched for about 10 minutes at room temperature in an aqueous solution comprising about 5 volume percent hydrofluoric acid and 5 volume percent nitric acid. Sample O was then heat treated in air to form a surface layer. The heat treatment process was substantially the same as the heat treatment for Sample B, with the exception that the furnace schedule comprised heating Sample O to about 1200° C. in about 7.5 hours, holding at about 1200° C. for about 1 hour, and cooling to room temperature with the furnace power turned off.

This Example illustrates that silicon carbide reinforced ceramic matrix composites may be etched by a variety of methods prior to the formation of a protective surface layer on the composite substrate.

EXAMPLE 6

To demonstrate the utility of a protective surface layer, flexural strength measurements were taken on samples of composite materials before and after an elevated temperature treatment.

Samples V and W

A silicon carbide reinforced ceramic matrix composite measuring about 3 ⅛ inch (79 mm) by 3 ⅛ inch (79 mm) by ⅜ inch (10 mm) was made by substantially the same procedure as outlined for Sample B in Example 2. Flexural strength bars measuring approximately 0.1 inch (3 mm) by 0.24 inch (6 mm) by 2 inches (51 mm) were cut from the composite using a diamond saw (Model 107555, Buehler Company, Lake Bluff, Ill.). The sliced specimen bars were then ground smooth using a 320 grit diamond grinding wheel (Fantastic Tool, Inc., Livingston, N.J.). The test bars were ground so that the grinding marks were parallel to the long dimension of the bar.

The mechanical strength of the sample test bars was measured in four point flexural loading at room temperature on a universal testing machine (Syntech, Stoughton, Mass.). The crosshead speed was approximately 0.02 inches/minute (0.5 mm/minute). The testing was performed in an air atmosphere at ambient atmospheric pressure.

The strength of the composite material without the protective layer, identified in Table 5 as Sample V, was found to be about 477 MPa.

The remaining composite material which had not been cut into flexural strength bars was then heated for about 100 hours at a temperature of about 1500° C. After the heat treatment step to form a protective layer on the composite, additional flexural strength test bars were machined from the composite and tested. Care was taken not to remove the protective layer during the machining operation. These bars are identified in Table 5 collectively as Sample W. The mean flexural strength was about 187 MPa.

TABLE 5

EFFECT OF SURFACE LAYER ON STRENGTH RETENTION

| Sample | Composite | Growth Alloy | Etchant | Heat Treatment Time (hrs) | Heat Treatment Temp (°C.) | Thermal Stability Test Parameters Time (hrs) | Thermal Stability Test Parameters Temp °C. | Ave. Strength @ R.T. (MPa) |
|---|---|---|---|---|---|---|---|---|
| J1 | 500# bl SiC/ Al₂O₃/Al[2] | Al—6Zn—10Si | None | None | N/A | None | N/A | 485 |
| J2 | 500# bl SiC/ Al₂O₃/Al[2] | Al—6Zn—10Si | 30 minutes in 20% HF/ 20% HNO₃ Solution | 0.5 | 1400 | None | N/A | 331 |
| J3 | 500# bl SiC/ Al₂O₃/Al[2] | Al—6Zn—10Si | 30 minutes in 20% HF/ 20% HNO₃ Solution | 0.5 | 1400 | 100 | 1490 | 272 |
| V | 500# bl SiC/ Al₂O₃/Al[2] | 380M | None | None | N/A | None | N/A | 477 |
| W | 500# bl SiC/ Al₂O₃/Al[2] | 380M | None | None | N/A | 100 | 1500 | 187 |

[2]SiC-reinforced Al₂O₃ composite (500 mesh SiC blend: 5 wt % 500# SiC, 75 wt % 1000# SiC, 20 wt % 100GL SiC)

Samples J1, J2 and J3

Silicon carbide reinforced composites measuring approximately 3 ⅛ inch (79 mm) by 3 ⅛ inch (79 mm) by ⅜ inch (10 mm) were prepared in substantially the same manner as described for Sample B in Example 2, except that the parent metal alloy used to form the composites comprised about 6 percent zinc, about 10 percent silicon and the balance aluminum.

Flexural strength test bars were machined from one of the composites (without a protective layer), and strength tests were performed in substantially the same manner as described for Sample V. These samples are identified in Table 5 collectively as Sample J1. The average four point flexural strength measured approximately 485 MPa.

Additional flexural strength test bars were cut from the composite and etched for 30 minutes in an acid solution comprising approximately 20 percent hydrofluoric acid and 20 percent nitric acid in water. This etching process removed a substantial portion of the metallic constituent of the composite material near the outer surfaces of the test bars. The flexural strength test bars were placed onto a rectangular support piece measuring about 10 inches (254 mm) by about 5 inches (127 mm) by about 1 inch (25 mm) and comprising reticulated mullite foam (Hi-Tech Ceramics, Alfred, N.Y.). The reticulated mullite support piece and the flexural strength bars were then loaded into a resistance heated air atmosphere furnace and heated to about 1400° C. over a period of about 6 hours. After about ½ hour at about 1400° C., power to the furnace was turned off and the furnace was allowed to cool to room temperature. A dense layer was observed on the exterior of the heat treated test bars. These test bars are identified in Table 5 collectively as Sample J2. The test bars were mechanically tested in four point loading and an average flexural strength of about 331 MPa was recorded.

The remaining flexural strength bars, which had been subjected to the first heat treatment for Sample J2, were then heated for about 100 hours at a temperature of about 150° C. These bars are identified in Table 5 collectively as Sample J3. Following this second heat treatment, the test bars were then tested and were found to have an average four point flexural strength of about 272 MPa.

This Example demonstrates that ceramic matrix composites which are heat treated to form a protective layer retain a greater fraction of their room temperature strength after a long exposure at high temperatures.

EXAMPLE 7

To demonstrate the corrosion protection afforded by the protective layer, electrochemical measurements were taken on samples of silicon carbide reinforced ceramic matrix composite material both with and without the protective layer.

Two 500 mesh (25 micron) silicon carbide reinforced ceramic matrix composites were made in a manner substantially identical to the technique outlined for Sample A in Example 1. One composite, designated Sample X, was not subjected to heat treatment and did not have a protective layer. The other composite, designated Sample Y, was subjected to a heat treatment in a manner substantially identical to the technique described for Sample B in Example 2.

Test specimen cubes measuring about 5/8 inch (16 mm) on each side were machined from each of the composites of Samples X and Y. The face of each specimen cube to be tested was lightly ground to an approximately 30 micron finish using a diamond impregnated metallographic wheel (Buehler Company, Lake Bluff, Ill.). Care was taken to avoid grinding off the surface layer of Sample Y. The sliced and ground specimens were then ultrasonically cleaned in methanol at room temperature for about 15 minutes. The samples were then placed into a forced air drying oven at a temperature of about 150° C. for about 30 minutes to dry them thoroughly, then placed immediately into a desiccator at room temperature for about 15 minutes to allow them to cool.

The sample to be corrosion tested was placed into an electrochemical cell (Flat Cell of Model 273 Potentiostat/Galvanostat, EG&G Princeton Applied Research, Princeton, N.J.). The corrosion test medium comprising sulfuric acid (pH of about 2) was prepared by first filling a 1000 mL Nalgene ® beaker with about 600 mL of distilled water. The electrodes of a pH meter (Model 220, Corning Medical and Scientific Company, Palo Alto, Calif.) were then lowered into the beaker. The meter, which had been previously calibrated with a buffer solution of pH 1, was then turned on, and concentrated sulfuric acid was slowly added to the beaker while stirring the solution. The reading on the pH meter was continuously monitored during the acid addition so that the addition could be halted once the pH had dropped to about 2. At this point, the concentration of this working solution was about 0.1 volume percent sulfuric acid. The electrochemical cell with its attached sample was then filled with this dilute acid solution.

A saturated Calomel reference electrode was inserted into the top of the cell. The electrical leads from the potentiostat (Model 273) were attached to the workings, counter, and reference electrodes of the cell.

A personal computer (DeskPro 286, Compaq Corporation, Houston, Tex.) and accompanying software (Model 342C, Softcorr Corrosion Software, EG&G Princeton Applied Research) was used to control the potentiostat during the test. The computer and potentiostat were programmed to change the applied potential between the sample and the reference electrode from about −100 mV to about +250 mV, with respect to the open circuit potential in increments of about 1 mV at a rate of about 1 mV per second. The current was measured by the potentiostat at each of the applied potentials.

Figure 8:
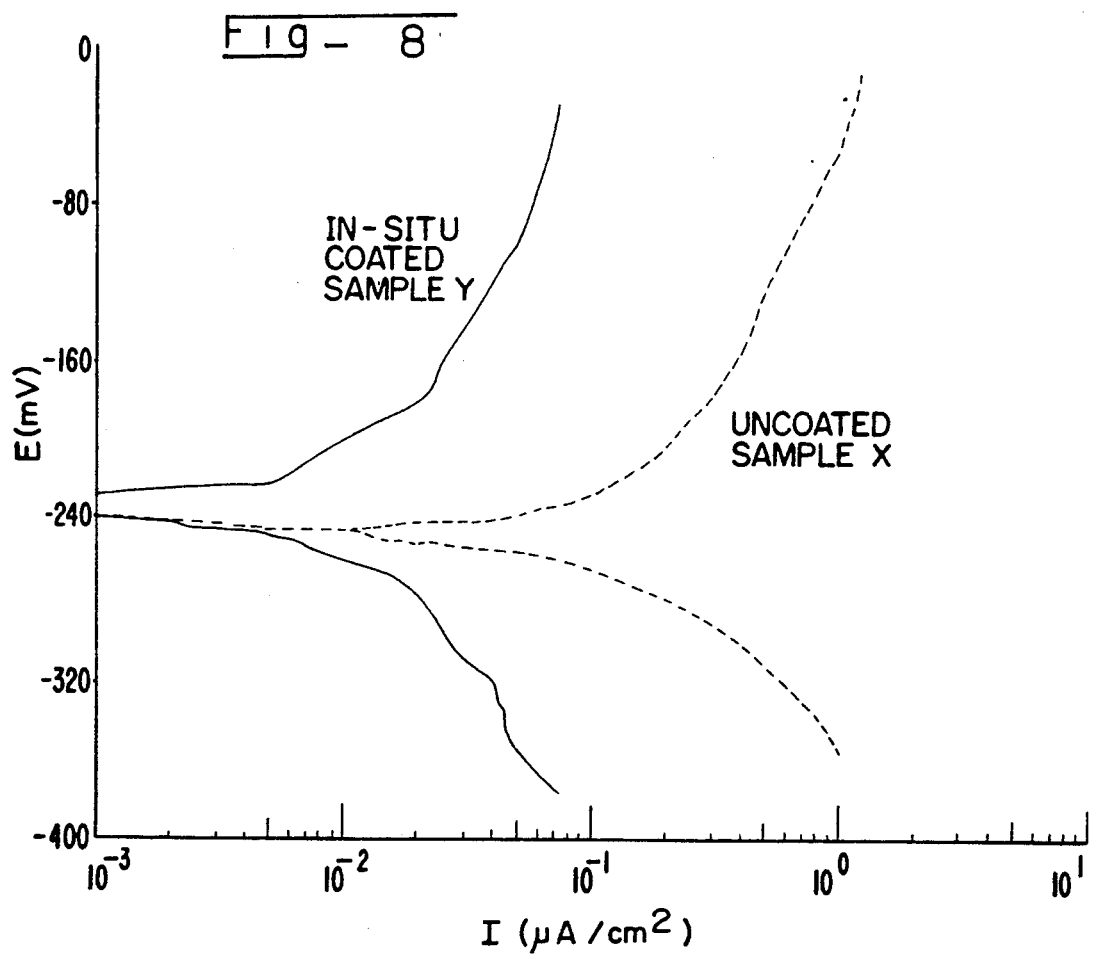
FIG. 8 is a Tafel plot of Samples X and Y in Example 7.
Figure 1A:
FIGS. 1a and 1b are photographs of a ceramic matrix composite body without a protective surface region which has been heated to about 1000° C. for about 24 hours.
Figure 1B:
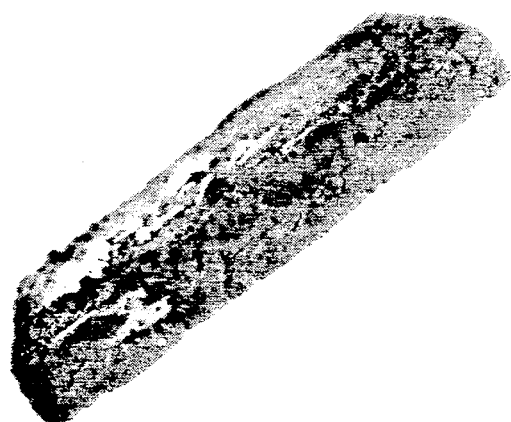

A plot showing the current as a function of the applied potential for Samples X and Y is shown in FIG. 8.

In an electrochemical corrosion test, corrosion rate is directly proportional to the current. The plot for Sample Y showed a corrosion current approximately one order of magnitude less than that shown for Sample X. Sample Y, therefore, corroded at a much slower rate than Sample X, thus indicating that the protective layer enhanced the corrosion resistance of the composite.

EXAMPLE 8

Figure 9A:
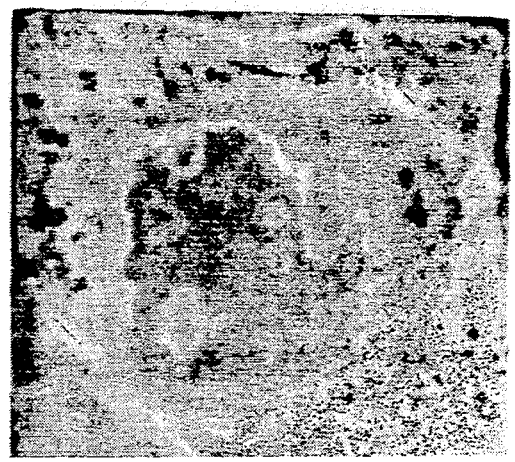
FIG. 9 is a photograph of the ceramic matrix composite body having a protective surface coating thereon, which has been heated to about 1490° C. for about 100 hours, in accordance with Example 9.
Figure 9B:
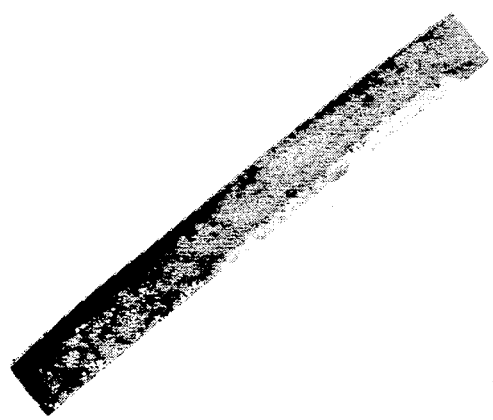

A composite having substantially the same dimensions and formed by substantially the same method as that used to make Sample I in Example 3 was etched and then heat treated in air to produce a protective surface layer. The etching treatment was substantially identical to that of Sample E in Example 3. The composite was then heat treated in substantially the same manner as the heat treatment of Sample B in Example 2. Subsequent to etching and heat treating, the sample was heated to about 1490° C. for about 160 hours. FIGS. 9a and 9b are photographs of the sample following the high temperature exposure. Although some areas of the composite exhibit a slight discoloration, the formation of overgrowth on the surface of the composite was substantially suppressed by the protective surface layer formed in the previous heat treatment. Dimensional integrity of the sample was thus maintained.

Example 8 demonstrates that composites having thereon protective surface layers are resistant to overgrowth of oxidation reaction product from surfaces of the composite exposed to oxidizing atmospheres at elevated temperatures. The formation of a protective surface layer thus enhances the dimensional integrity of formed composites upon exposure to high temperature environments.

EXAMPLE 9

The following Example demonstrates, among other things, the formation of a protective region or coating on at least a portion of a ceramic matrix composite body. The coating or protective region is formed at a temperature which is higher than the melting point of at least one component of ceramic matrix composite body. In the following Example, at least one external material is provided to at least a portion of the ceramic matrix composite body and, at a higher temperature, at least two components of the ceramic matrix composite body may react with, for example, each other, with at least one component of the atmosphere, with at least one external material provided to the system, and/or any combination of the above to form at least some protective region or coating on at least a portion of the surface of the ceramic matrix composite body. Specifically, this Example demonstrates the formation of a protective region or coating on at least a portion of a ceramic matrix composite body by the application of, for example, aluminum titanate powder, titanium oxide or rutile powder, a monoaluminum phosphate solution (i.e., $Al(H_2PO_4)_3$), calcium silicate powder, alumina powder, silica powder, chromium oxide or chromia powder, calcium phosphate powder, calcium carbonate powder and/or mixtures thereof to at least a portion of the surface of the ceramic matrix composite body.

Table 6 contains a summary for Samples X-AP of the present Example. Specifically, Table 6 includes the ceramic matrix composite bodies on which at least one protective region was formed on at least a portion of the surface, the parent metals used to form the ceramic matrix composite bodies, the technique used to remove the metallic constituent from the ceramic matrix composite bodies, if any, and the protective region or coating formation techniques used.

TABLE 6

| Sample | Composite | Parent Metal | Metal Removal Technique | Coating Formation Technique |
|---|---|---|---|---|
| X | $SiCp^7/Al_2O_3$/metal | Al-23 wt % Si-6 wt % Zn | Etch in a $HF/HNO_3$ solution at room temperature for about 2 hours. | Fire in an air atmosphere furnace at 1400° C. for 2 hours. |
| Y | $SiCp^7/Al_2O_3$/metal | Al-23 wt % Si-6 wt % Zn | Etch in a $HF/HNO_3$ solution at room temperature for about 2 hours. | Coat with a milled, 50 wt % $Al_2TiO_5$ 50 wt % $TiO_2$ mixture, fire in air at 1400° C. for 2 hours. |
| Z | $SiCp^7/Al_2O_3$/metal | Alloy 2[9] | Etch in a $1 \times 10^{-4}$ mm hg vacuum at 1200° C. for about 2 hours. | Fire in air at 1400° C. for about 0.5 hours. |
| AA | $SiCp^7/Al_2O_3$/metal | Al-23 wt % Si-6 wt % Zn | Etch in a $HF/HNO_3$ solution at room temperature for about 2 hours. | Coat with a 50% monoaluminum phosphate solution/50% deionized water solution, fire in air at 1500° C. for about 1 hour. |
| AB | $SiCp^7/Al_2O_3$/metal | Al-23 wt % Si-6 wt % Zn | Etch in a $HF/HNO_3$ solution at room temperature for about 2 hours. | Coat with −325 mesh $CaSiO_3$, fire at 1100° C. for about 1 hour. |
| AC | $SiCp^7/Al_2O_3$/metal | Al-23 wt % Si-6 wt % Zn | Etch in a $HF/HNO_3$ solution at room temperature for about 2 hours. | Coat with 67 wt % $Al_2O_3$/33 wt % $SiO_2$ mixture, fire in air at 1500° C. for about 4 hours. |
| AD | $SiCp^7/Al_2O_3$/metal | Al-23 wt % Si-6 wt % Zn | Etch in a $HF/HNO_3$ solution at room temperature for about 2 hours. | Coat with a 94 wt % $Al_2O_3$/6 wt % $SiO_2$ mixture, fire in air at 1500° C. for about 4 hours. |
| AE | $SiCp^7/Al_2O_3$/metal | Al-23 wt % Si-6 wt % Zn | Etch in a 20 volume percent HCl solution at room temperature for about 2 hours. | Coat with 67 wt % $Al_2O_3$/33 wt % $SiO_2$ mixture, fire in air at 1500° C. for about 4 hours. |
| AF | $SiCp^7/Al_2O_3$/metal | Al-23 wt % Si-6 wt % Zn | Etch in a 20 volume percent HCl solution at room temperature for about 2 hours. | Coat with a 94 wt % $Al_2O_3$/6 wt % $SiO_2$ mixture, fire in air at 1500° C. for about 4 hours. |
| AG | $SiCp^7/Al_2O_3$/metal | Al-23 wt % Si-6 wt % Zn | Etch in a $HF/HNO_3$ solution at room temperature for about 2 hours. | Coat with a 98 wt % $Al_2O_3$/2 wt % $SiO_2$ mixture, fire in air at 1500° C. for about 6 hours. |
| AH | $SiCp^7/Al_2O_3$/metal | Al-23 wt % Si-6 wt % Zn | Etch in a $HF/HNO_3$ Solution at room temperature for about 2 hours. | Coat with a 100 wt % $Al_2O_3$, fire in air at 1500° C. for about 6 hrs. |
| AI | $SiCp^7/Al_2O_3$/metal | Al-23 wt % Si-6 wt % Zn | Etch in a $HF/HNO_3$ solution at room temperature for about 2 hours. | Coat with a 95 wt % $Al_2O_3$/5 wt % $Cr_2O_3$ mixture, fire in air at 1500° C. for about 6 hours. |
| AJ | $SiCp^7/Al_2O_3$/metal | Al-23 wt % Si-6 wt % Zn | Etch in a $HF/HNO_3$ solution at room temperature for about 2 hours. | Coat with 90 wt % $Al_2O_3$/10 wt % $Cr_2O_3$ mixture, fire in air at 1500° C. for about 6 hours. |
| AK | $SiCp^7/Al_2O_3$/metal | Al-23 wt % Si-6 wt % Zn | Etch in a $HF/HNO_3$ solution at room temperature for about 2 hours. | Coat with 87.5 wt % $Al_2O_3$/12.5 wt % $Cr_2O_3$ mixture, fire in air at 1500° C. for about 6 hours. |
| AL | $SiCp^7/Al_2O_3$/metal | Al-23 wt % Si-6 wt % Zn | None | Coat with $Ca_3(PO_4)_2$, fire in air at 1500° C. for about 4 hours. |
| AM | $SiCp^7/Al_2O_3$/metal | Al-23 wt % Si-6 wt % Zn | None | Coat with $Ca_3(PO_4)_2$ and monoaluminum phosphate, fire in air at 1500° C. for about 4 hours. |
| AN | $SiCp^7/Al_2O_3$/metal | Al-23 wt % Si-6 wt % Zn | None | Coat with $CaCO_3$, fire in air at at 1400° C. for 0.5 hour. |
| AO | $SiCp^7/Al_2O_3$/metal | Al-23 wt % Si-6 wt % Zn | None | Coat with $CaCO_3$ and monoaluminum phosphate, fire in air at 1400° for 0.5 hours |
| AP | $SiCp^7/Al_2O_3$/metal | Al-23 wt % Si-6 wt % Zn | None | Coat with monoaluminum phosphate, fire in air at 1400° C. for 0.5 hr. |

[7] SiCp filler comprises a mixture by weight of about 10 wt % 1200 grit SiC, 50 wt % 1000 grit SiC (fired at 1250° C. for 4.5 hours), 30 wt % 500 grit SiC (fired at 1325° C. for 24 hours) and 10 wt % 0.6 micron diameter.
[8] $HF/HNO_3$ solution comprised by volume about 20% hydrofluoric acid, 20% nitric acid and the balance deionized water.
[9] Alloy 2 nominally comprises by weight about 15.0-16.5% Si, 3.0-3.8% Cu, 2.7-3.3% Zn, 0.2-0.3% Mg, ≦0.01% Ca, ≦0.10% Ti, 0.7-1.0% Fe, ≦0.5% Ni, ≦0.5% Mn, ≦0.35% Sn, ≦0.001% Be, ≦0.15% Pb and the balance aluminum.

Samples X, Y and AA-AP were made using ceramic matrix composite bodies made substantially by the same method. Specifically, the ceramic matrix composite bodies of Samples X, Y and AA-AP comprised plates measuring about 6 inches (152 mm) square by 1 inch (125 mm) thick and tubes having outer diameters measuring from about 1 inch (25 mm) to about 4.75 inches (121 mm). The following discussion presents the method for forming the ceramic matrix composite body in a plate form. It should be apparent to an artisan of ordinary skill in the art that the fabrication techniques described below could be applied to the formation of tubular or other complex shaped products in a substantially similar manner.

To prepare filler materials for incorporation into a slip for slipcasting preforms, 39 CRYSTOLON ® 500 grit (average particle diameter of about 17 microns) silicon carbide (Norton Co., Worcester, Mass.) was placed into a refractory boat measuring about 14 inches (356 mm) long by about 11 inches (279 mm) wide by about 6 inches (152 mm) deep, lined with a FIBERFRAX ® ceramic paper (The Carborundum Co., Fibers Division, Niagara Falls, N.Y.) measuring about 19 inches long by about 16 inches wide and about 0.125 inch (3.2 mm) thick. The FIBERFRAX ® ceramic paper (The Carborundum Co., Fibers Division, Niagara Falls, N.Y.) was cut and folded so as to cover the bottom and sidewalls of the refractory boat. After the refractory boat had been substantially completely filled with the 500 grit silicon carbide, the refractory boat and its contents were placed into a resistance heated air atmosphere furnace. After the furnace door was closed, the furnace and its contents were heated from about room temperature to about 500° C. in about 2 hours, then heated from about 500° C. to about 800° C. in about 1 hour, then heated from about 800° C. to about 1000° C. in about 2 hours, then heated from about 1000° C. to about 1325° C. in about 10 hours and held at about 1325° C. for about 24 hours, after which time the power to the furnace was interrupted. The furnace and its contents were allowed to cool to about room temperature. At about room temperature, the fired 500 grit silicon carbide was removed from the boat, and it was noted that the silicon carbide had partially sintered or agglomerated. The partially sintered, fired 500 grit silicon carbide mass was then placed into a jaw crusher. The crushed product from the jaw crusher was then placed into a SWECO vibratory mill containing 1 inch diameter alumina milling balls and a 200 mesh (average opening of about 75 microns) screen. The fired silicon carbide material that passed through the 200 mesh (average opening of about 75 microns) screen was sized so as to be ready for incorporation into a mixture to form a slip. The silica content of the fired 500 grit silicon carbide conformed to the acceptable range of from about 15% to about 18% by weight.

A substantially similar process was used to prepare a 39 CRYSTOLON ® 1000 grit (average particle diameter of about 5 microns) silicon carbide (Norton Co., Worcester, Mass.) for incorporation into a slip, except that the firing schedule was altered. Specifically, the furnace and its contents were heated from about room temperature to about 500° C. in about 2 hours, then heated from about 500° C. to about 800° C. in about 1 hour, then heated from about 800° C. to about 1000° C. in about 2 hours, then heated from about 1000° C. to about 1250° C. in about 7 hours and held at about 1250° C. for about 4.5 hours. As with the fired 500 grit silicon carbide, the fired 1000 grit silicon carbide was first jaw crushed and then fed into a SWECO vibratory mill containing 1 inch (25 mm) aluminum balls. The product from the vibratory mill was then sized for incorporation into a mixture to form a slip. The silica content of the fired 1000 grit silicon carbide conformed to the acceptable range of from about 15% to about 18% by weight.

About 25 kg of a slip were prepared by combining in a 20 liter NALGENE ® plastic jug (Nalge Co., Rochester, N.Y.) about 10 kg of about 1 inch (25 mm) diameter BURUNDUM ® alumina milling media, about 6.25 kg of deionized water, about 1.875 kg of 39 CRYSTOLON ® 1200 grit (average particle diameter of about 4 microns) silicon carbide, about 9.375 kg of the fired 39 CRYSTOLON ® 1000 grit silicon carbide, about 5.625 kg of the fired 39 CRYSTOLON ® 500 grit silicon carbide (Norton Co., Worcester, Mass.), about 1.875 kg of HSC-059 silicon carbide (Superior Graphite Co., Chicago, Ill.) having an average particle diameter of about 0.6 microns, about 0.025 kg of a deflocculant solution comprised by weight of about 50% DAR-VAN-821A deflocculant (R. T. Vanderbilt Co., Inc., Norwalk, Conn.) and about 50% deionized water. After all of the above ingredients were placed into the plastic jar, the plastic jar was closed and placed on a jar mill. After about 23 hours of roll milling, the plastic jar was removed from the jar mill and about 0.25 kg of an ammonium alginate solution comprising by weight about 1% SUPERLOID ® ammonium alginate (Kelco, Clark, N.J.) and the balance deionized water was added to the contents of the plastic jar. The plastic jar and its contents were then placed back on the jar mill and roll milled for about an additional hour.

After a total of about 24 hours of roll milling, the plastic jar and its contents were removed from the jar mill. A plastic lid for the plastic jar having holes in the lid measuring about 0.5 inch (13 mm) replaced the lid of the plastic jar and the contents of the plastic jar were poured through the holes to separate the slip from the alumina milling media. About 500 ml of the slip were then placed into a 1000 ml beaker which was then placed in position under a Model RV Brookfield viscometer (Brookfield Engineering Labs, Inc., Stoughton, Mass.) with a No. 4 spindel to measure the viscosity of the slip. With the viscometer set at a speed of about 100 rounds per minute, a dial reading whithin the acceptable range of about $5 \pm 0.2$ was obtained. This acceptable range corresponds to a slip viscosity of about 50 centipoise. The specific gravity of the slip was measured to be within the acceptable range of about $2.01 \pm 0.01$ grams per cubic centimeter by placing about 100 ml of the slip into a graduated cylinder and onto a balance. The pH of the slip was measured to be within the acceptable range of about $5.08 \pm 2$ by allowing the pH electrode of the pH meter to sit submerged in the slip for about a minute. The slip was then placed back into a second jar without alumina milling media until it was to be poured into plates, tubular shapes or other complex shapes.

To slip cast a silicon carbide plate preform, a two-piece plaster of paris mold having an internal cavity measuring about 3.125 inches (79 mm) square by about 0.375 inch (9.5 mm) thick was moistened slightly with water to a moisture content between about 5 weight percent and about 8 weight Percent. The two-piece mold was then assembled and held together with rubber bands.

After degassing in a vacuum chamber (Supervacmac Model No. 160-015, Swest, Dallas, Tex.) to about 30 inches (760 mm) of mercury vacuum for about 5 minutes, the slip was then poured into the cavity of the two-piece plaster mold. The slip was poured slowly down the side of the two-piece plaster mold to prevent any trapping of air into the slip. Approximately 30 minutes were required for the slip to fill the entire mold cavity. After forming, the preform was removed from the two-piece plaster mold. The preform was then dried on a drying rack for about 12 hours under ambient conditions. The preform was placed into a drying oven set at about 40° C. for about 6 hours for additional drying, then the dry preform was hand sanded to provide clean and smooth surfaces which were free of casting defects.

The sanded preform was placed on top of slotted firebricks and loaded into a resistance heated air atmosphere furnace at room temperature. The furnace and its contents were heated from about room temperature to about 1025° C. in about 8 hours. After about 16 hours at about 1025° C., the power to the furnace was interrupted and the furnace and its contents were allowed to cool to about room temperature. The fired preform was then coated on 5 sides with a slurry comprising by weight about 50% −325 (particle diameter less than about 45 microns) wollastonite (NYCO Corporation, Willsboro, N.Y.) and about 50% YK thinner (ZYP Coating, Inc., Oak Ridge, Tenn.). Prior to application, the slurry had been roll mixed on a jar mill for about 2 hours. The uncoated side of the preform was coated with a slurry comprising by weight about 90% −325 mesh (particle diameter less than about 45 microns) silicon metal powder (Atlantic Equipment Engineers, Bergenfield, N.J.) suspended in ethanol. The coatings were dried for about 6 hours in a forced air oven set at about 40° C.

A parent metal ingot measuring about 4 inches (102 mm) square by about 1 inch (25 mm) thick was polished to remove any oxide on the surface of the ingot. A bedding comprised of coarse wollastonite (NYCO Corporation, Willsboro, N.Y.) was then placed, to a depth of about 1 inch (25 mm), into the bottom of a refractory boat. The parent metal ingot was then placed into the coarse wollastonite bedding with the polished surface facing up. The coated and prefired preform was placed on top of the parent metal ingot with the silicon coating facing down. Additional coarse wollastonite was then placed into the refractory boat to a level flush with the top of the coated and prefired preform to form a growth lay-up.

The lay-up and its contents were then placed into a resistance heated air atmosphere furnace at about room temperature. The furnace and its contents were then heated from about room temperature to about 950° C. in about 12 hours, held at about 950° C. for about 100 hours, then cooled from about 950° C. to about 800° C. in about 2 hours. At a temperature of about 800° C., the power to the furnace was interrupted, the furnace door was opened and the ceramic matrix composite body formed by the growth of an oxidation reaction product from the parent metal to embed the coated and prefired preform was removed from the surface of the parent metal alloy pool and set to the side on the bedding of coarse wollastonite. The furnace door was then closed, and the furnace and its contents were allowed to cool to about room temperature. At about room temperature, the formed ceramic matrix composite body was sandblasted to remove any residual metal or barrier material adhered to its exterior.

Similar procedures were used to prepare tubular products having outer diameters ranging from about 1 inch (25 mm) to about 4.75 inches (121 mm), except that the surface dopant and the parent metal were supplied to the inner diameter of tubular preforms and the barrier was applied to the outer diameter of the tube.

In some instances, it is desirable to remove a portion of the metallic constituent from a formed ceramic matrix composite body prior to forming a protective region or coating on the surface of the composite. Table 6 demonstrates three of any number of methods that might be used for removing the metallic constituent from a ceramic matrix composite body prior to the formation of the protective region or coating. Specifically, the metallic constituent removal techniques listed in Table 6 include removal by etching in a hydrofluoric acid/nitric acid (HF/HNO$_3$) solution, etching in a hydrochloric acid (HCl) solution and vacuum etching at an elevated temperature. Etching in a hydrofluoric acid/nitric acid solution comprises the steps of preparing a solution comprised by volume of about 20% hydrofluoric acid, having an assay (w/w) of about 49% (obtained from Fisher Scientific, Pittsburgh, Pa.), about 20% nitric acid having an assay (w/w) of about 71% (obtained from Fisher Scientific, Pittsburgh, Pa.) and the balance deionized water. The ceramic matrix composite body was first cleaned of any dirt, grease or cutting fluids by placing it in an ultrasonically agitated bath comprised of methanol. The ceramic matrix composite body was then placed into a plastic container and the HF/HNO$_3$ solution was poured into the plastic container to substantially completely cover the ceramic matrix composite. After about 2 hours, during which time the metallic constituent had been removed to a depth of about 50 microns, the ceramic matrix composite body was removed from the HF/HNO$_3$ solution using metal tongs and flushed with a solution comprised of ALCONOX® cleaner in tap water. The ceramic matrix composite body was again cleaned in the ultrasonically agitated bath comprised of methanol.

When the metallic constituent of the ceramic matrix composite body was removed using the hydrochloric acid solution method for metallic constituent removal, the method was substantially the same as that of the HF/HNO$_3$ solution method, except that the etching solution comprised by volume about 20% hydrochloric acid (obtained from Fisher Scientific, Pittsburg, Pa.) and the balance deionized water.

When the metallic constituent of the ceramic matrix composite body was removed by the vacuum etching technique, the ceramic matrix composite body was placed onto commercially available sintered alumina rods to support the body within the chamber of a vacuum furnace. The vacuum furnace door was then closed and the vacuum furnace chamber and its contents were evacuated to a pressure of about $3.9 \times 10^{-6}$ inches ($10^{-4}$ mm) of mercury vacuum. The vacuum furnace and its contents were then heated to about 1200° C. at a rate of about 400° C. per hour, held at about 1200° C. for about 4 hours and then cooled to about room temperature while maintaining a vacuum of about $3.9 \times 10^{-6}$ inches ($10^{-4}$ mm) of mercury.

Sample X

After the ceramic matrix composite body had been prepared for the formation of a protective region by etching the metallic constituent with an HF/HNO$_3$ solution, the ceramic matrix composite body was placed into a resistance heated air atmosphere furnace supported by commercially available sintered alumina rods. The furnace door was closed and the furnace and its contents were heated from about room temperature to about 1400° C. in about 4 hours, then held at about 1400° C. for about 0.5 hour, after which time the power to the furnace was interrupted. The furnace and its contents were then allowed to cool to about room temperature. At about room temperature, Sample X was removed from the resistance heated air atmosphere furnace, and it was noted that the surface of Sample X comprised a protective region or coating.

Sample Y

Sample Y was prepared substantially in accordance with the method used to prepare Sample X, except that prior to placing the ceramic matrix composite body into the resistance heated air atmosphere furnace, the surface of the ceramic matrix composite body was substantially completely covered, by painting with a foam brush, with one coating of a mixture comprising by weight about 33.3% aluminum titanate (Mason Color Works, East Liverpool, Ohio), about 33.3% TiO$_2$ or rutile (Continental Mineral Processing Corp., Cincinnati, Ohio) and about 33.3% YK Thinner (ZYP Coatings, Inc., Oak Ridge, Tenn.). Sample Y was fired substantially as described for Sample X, except that Sample Y was held at about 1400° C. for about 2 hours. At about room temperature, it was noted that the surface of Sample Y comprised a protective region or coating.

Sample Z

Sample Z was prepared substantially in accordance with the method used to prepare Sample X, except that instead of using a parent metal or growth alloy comprised by weight of about 23 percent silicon, 6 weight percent zinc and the balance aluminum (Al-23 wt% Si-6 wt% Zn), Alloy 2 was used. Specifically, Alloy 2 comprised nominally by weight about 15.0–16.5% silicon, 3.0–3.8% copper, 2.7–3.3% zinc, 0.2–0.3% magnesium, ≦0.01% calcium, ≦0.10% titanium, 0.7–1.0% iron, ≦0.5% nickel, ≦0.5% manganese, ≦0.35% tin, ≦0.001% beryllium, ≦0.15% lead and the balance aluminum. Furthermore, the metal removal technique for the ceramic matrix composite body comprised the vacuum etching technique discussed above. After Sample Z had been fired in air at 1400° C. for about 5 hours and cooled to room temperature, it was noted that the surface of Sample Z comprised a protective region or coating.

Sample AA

Sample AA was made substantially in accordance with the method used to prepare Sample X, except that prior to placing the ceramic matrix composite body into the resistance heated air atmosphere furnace, the surface of the ceramic matrix composite body was covered with a mixture comprising by weight about 50% AL-BRITE ® monoaluminum phosphate solution, (i.e., Al(H$_2$PO$_4$)$_3$) and about 50% deionized water. Additionally, the covered ceramic matrix composite body was fired at about 1500° C. for about an hour. After Sample AA had cooled to about room temperature, it was noted that the surface of Sample AA comprised a protective region or coating.

Sample AB

Sample AB was made substantially in accordance with the method used to prepare Sample X, except that prior to placing the ceramic matrix composite body into the resistance heated air atmosphere furnace, the surface of the ceramic matrix composite body was coated with a mixture comprising by weight about 50% −325 mesh (particle diameter less than about 45 microns) calcium silicate (NYCO Products, Willsboro, N.Y.) and 50% YK Thinner (ZYP Coating, Inc., Oak Ridge, Tenn.). Furthermore, the surface covered ceramic matrix composite body was fired at about 1100° C. for about an hour. After the ceramic matrix composite body had cooled to about room temperature, it was noted that the surface of Sample AB comprised a protective region or coating.

Samples AC, AD, AE, AF, AG and AH

Samples AC-AH were made substantially in accordance with to the method used to prepare Sample X, except that the metallic constituent from the ceramic matrix composite bodies used to make Samples AE and AF, was removed using the HCl solution. Also, prior to placing the ceramic matrix composite bodies in a resistance heated air atmosphere furnace, the ceramic matrix composite bodies were covered with various alumina/silica mixtures as summarized in Table 6.

Specifically, A-1000SG aluminum oxide having an average particle diameter of about 0.6 microns (Alcoa Industrial Chemicals Division, Bauxite, Ariz.) was mixed with MINUSIL ® 5 silica having an average particle diameter of about 5 microns (U.S. Silica, Berkeley Springs, W. Va.) in the amounts noted in Table 6. These mixtures were then combined with about 50% by weight YK Thinner (ZYP Coatings, Inc., Oak Ridge, Tenn.) to form the paintable mixtures that were painted on the ceramic composite bodies used to make Samples AC-AF and AH. To prepare the mixture used in Sample AG, a mixture comprising about 98 wt% Al$_2$O$_3$ and 2 wt% SiO$_2$, was combined with about 62.5% by weight YK Thinner (ZYP Coatings, Inc., Oak Ridge, Tenn.) to form a paintable mixture that was painted on the surface of the ceramic matrix composite body used to make Sample AG.

After the coating mixtures were applied to the surfaces of the ceramic matrix composite bodies, the ceramic matrix composite bodies were placed into a resistance heated air atmosphere furnace and held at the temperatures for the times summarized in Table 6. After the hold times summarized in Table 6 had elapsed, the power to the furnace was interrupted and the furnace and its contents were allowed to cool to about room temperature. At about room temperature, it was noted that protective regions or coatings substantially completely covered the surfaces of the ceramic matrix composite bodies.

Samples AC, AD and AG were cut, mounted and polished for metallographic examination. FIGS. 10$a$, 10$b$ and 10$c$ are photomicrographs taken at a magnification of about 200× showing the resultant protective region or coating formed on the ceramic matrix composite bodies for Samples AC, AD and AG respectively. The protective region or coating thicknesses were about 80 microns, 70 microns and 60 microns thick, respectively, decreasing with increasing starting alumina content. Furthermore, results of x-ray diffraction analysis of the protective region or coating on the surface of the ceramic matrix composite bodies, including an area adjacent to the protective region or coating, indicated that the protective region comprised, among other phases, mullite, cristobalite and alumina.

Samples AI, AJ and AK

Figure 10A:
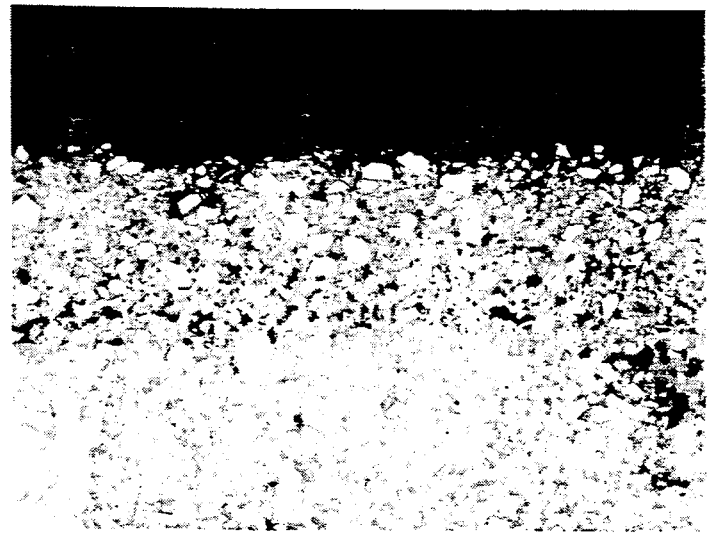
FIG. 10a through 10d correspond to photographs taken at a magnification of about 200× of the protective regions or coatings formed on Samples AC, AD, AG and AK of Example 9.
Figure 10B:
Figure 10C:
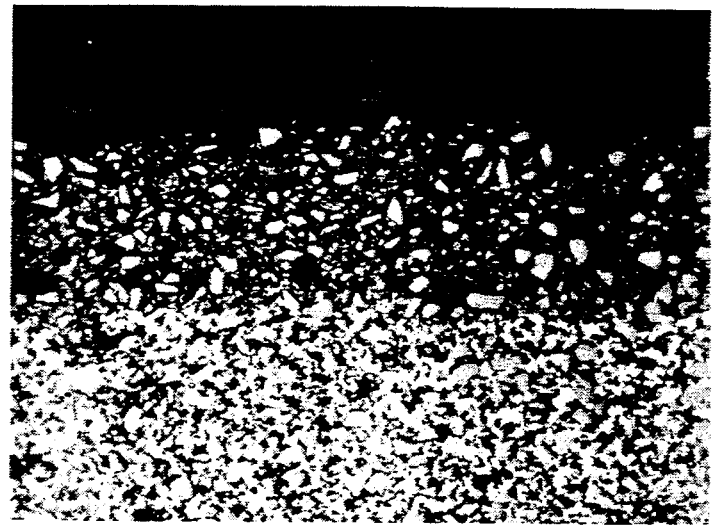
Figure 10D:

Samples AI-AK were formed substantially in accordance with the method used to prepare Sample X, except that prior to placing the ceramic matrix composite bodies into the resistance heated air atmosphere furnace, the ceramic matrix composite bodies was coated with an alumina/chromia mixture. Specifically, equal portions of A-1000SG aluminum oxide (Alcoa Industrial Chemicals Division, Bauxite, Ariz.) and chrome (III) oxide, having a purity of about 98% (Johnson Matthey, Ward Hill, Mass.) were mixed at about 25 percent by weight solids in YK Thinner (ZYP Coatings Inc., Oak Ridge, Tenn.). Furthermore, the covered ceramic matrix composite bodies were fired at about 1500° C. for about 6 hours. After the 6 hour period had elapsed, the power to the furnace was interrupted and the furnace and its contents were allowed to cool to about room temperature. At about room temperature, it was noted that a protective region or coating had formed on at least a portion of a surface of the ceramic matrix composite bodies. Furthermore, several of the treated ceramic matrix composite bodies were cross-sectioned, mounted and polished for metallographic examination. FIG. 10d is a photomicrograph of the protective region or coating formed on Sample AK. Furthermore, x-ray diffraction analysis results of the protective region or coating, including the area adjacent to the protective region or coating, for Samples AI through AK indicated that the protective region or coating was comprised of, among other phases, mullite, alumina and silicon carbide.

Samples AL, AM, AN, AO and AP

Samples AL-AP were formed substantially in accordance with the method used to prepare Sample X, except that the metallic constituent was not removed from the ceramic matrix composite body. Furthermore, the ceramic matrix composite body was coated with either calcium phosphate powder, calcium carbonate or a monoaluminum phosphate solution (i.e., $Al(H_2PO_4)_3$) prior to exposing the ceramic matrix composite body to an elevated temperature treatment. Specifically, a mixture comprising by weight about 50% calcium phosphate (Johnson Matthey, Ward Hill, Mass.) and about 50% YK Thinner (ZYP Coatings, Inc., Oak Ridge, Tenn.) was painted, using a foam brush, on the surface of a ceramic matrix composite body and then fired to form Sample AL. A mixture comprising by weight about 50% calcium phosphate (Johnson Matthey, Ward Hill, Mass.) and about 50% ALBRITE ® monoaluminum phosphate solution (i.e., $Al(H_2PO_4)_3$ from Albright and Wilson, Richmond, Va.) was painted, using a foam brush, on the surface of a ceramic matrix composite body and then fired to form Sample AM. A mixture comprising by weight about 50% calcium carbonate precipitated powder (Fisher Scientific, Pittsburgh, Pa.) and about 50% YK Thinner (ZYP Coatings, Inc., Oak Ridge, Tenn.) was painted, using a foam brush, on the surface of a ceramic matrix composite body and then fired to form Sample AN. A mixture comprising by weight about 50% calcium carbonate (Fisher Scientific, Pittsburgh, Pa.) and about 50% ALBRITE ® monoaluminum phosphate solution (Albright and Wilson, Richmond, Va.) was painted, using a foam brush, on the surface of a ceramic matrix composite body and then fired to form Sample AO. A monoaluminum phosphate solution was painted, using a foam brush, on the surface of a ceramic matrix composite and then fired to form Sample AP. Each of Samples AL-AP was placed into a resistance heated air atmosphere furnace and heated to the temperature indicated in Table 6 for the indicated time. After the indicated time, the power to the furnace was interrupted and the furnace and its contents were allowed to cool to about room temperature. At about room temperature, it was noted that a protective region or coating had formed on the surfaces of the ceramic matrix composite bodies. Results of x-ray diffraction of the protective region or coating and areas adjacent to the protective region or coating indicated that some reactions may have occurred between the externally applied material and the ceramic matrix composite bodies. Specifically, the results of x-ray diffraction analysis for Sample AN indicated that the protective region or coating comprised, among other phases, anorthite and alumina. The results of x-ray diffraction analysis for Sample AO indicated that the protective region comprised, among other phases, alumina, aluminum orthophosphate, silicon carbide and silicon.

Thus this Example demonstrates that the formation of a protective region or coating on at least a portion of a ceramic matrix composite body may be effected at an elevated temperature by providing at least one external material to at least a portion of the ceramic matrix composite body.

EXAMPLE 10

The following Example demonstrates the formation of a ceramic matrix composite body having a tubular shape and a surface at least partially coated with a protective region or coating. Specifically, the following Example demonstrates the formation of a tubular shape having a length of about 60 inches (1524 mm), an outer diameter of about 2 inches (51 mm) and a wall thickness of about 0.24 inch (6 mm) by growing an oxidation reaction product at an elevated temperature into a pre-fired slipcast silicon carbide preform, removing a portion of the metallic constituent from the grown ceramic matrix composite body by submerging the grown ceramic matrix composite body in a $HF/HNO_3$ solution, coating the surface of the etched ceramic matrix composite body with a solution comprised of monoaluminum phosphate (i.e., $Al(H_2PO_4)_3$) and firing the coated ceramic matrix composite body at a temperature of about 1500° C. for about an hour.

A silicon carbide preform having an outer diameter of about 2 inches (51 mm), a wall thickness of about 0.24 inch (6 mm) and a height of about 60 inches (1524 mm), was formed by pouring a slip, made substantially in accordance with the method used to make the slip of Example 9, into the internal cavity of a two-piece plaster mold. The internal cavity of the two-piece plaster mold had a diameter of about 1.94 inches (493 mm) and a length of about 60 inches (1524 mm). The water content of the two-piece plaster mold was within the acceptable range of from about 5 to about 8 weight percent. In order to effect the formation of the silicon carbide preform within the two-piece plaster mold, a commercially available clear polymethylmethacrylate pipe having an inner diameter of about 1.7 inches (43 mm) and a weight of about 13.75 inches (349 mm) was inserted into the open end of the internal cavity of the two-piece plaster mold so that the tube extended beyond the end of the plaster mold. An appropriate amount of silicon carbide slip comprising about 5.3 kg was poured into the polymethylmethacrylate pipe and into the two-piece plaster mold to substantially completely fill the plaster mold and to fill a portion of the clear polymethylmethacrylate pipe. When the volume of the slip within the polymethylmethacrylate pipe fell to a level substantially level with the top of the two-piece plaster mold, a silicon carbide preform having a wall thickness of about 0.24 inch (6 mm) had formed. The remaining slip was then poured from the mold. The silicon carbide preform was removed from the mold and allowed to dry for about 12 hours. The tubular silicon carbide preform was fired, supported by a CYSTAR ® silicon carbide rail, in a manner substantially according to the method described in Example 9. Specifically, the tubular silicon carbide preform was placed into a resistance heated air atmosphere furnace at about room temperature and heated from about room temperature to about 80° C. After about 16 hours at about 80° C., the furnace and its contents were heated from about 80° C. to about 1025° C. in about 12 hours. After about 16 hours at about 1025° C., the power to the furnace was interrupted and the furnace and its contents were allowed to cool to room temperature.

At about room temperature, the surface of the prefired tubular silicon carbide preform was sanded using 60 grit (average particle diameter of about 406 microns) sanding paper to remove mold seams. The preform was sanded further using 120 grit (average particle diameter of about 142 microns) and 240 grit (average particle diameter of about 63 microns) sandpaper in succession until a uniform surface finish was achieved. Finally, a 400 grit (average particle diameter of about 22 microns) sandpaper was used to ensure a smooth surface finish on the outer diameter of the prefired silicon carbide preform.

A dopant material mixture which was to be applied to the inner diameter of the prefired tubular silicon carbide preform was prepared by mixing about 2000 grams of distilled water at a temperature of about 75° C. with about 40 grams of a polyvinyl alcohol powder in an electric mixer having a propeller blade attachment until the polyvinyl alcohol powder was substantially completely dissolved in the distilled water. About 200 grams of −325 mesh silicon metal powder were then added to the 2000 grams of the polyvinyl alcohol/deionized water solution and substantially completely dispersed in the solution by mixing with the electric mixer. Because one end of the prefired tubular silicon carbide preform was closed as a result of the slip casting step, about 1 liter of the dopant material mixture was poured into and immediately from the inner cavity of the prefired tubular silicon carbide preform, thereby coating the inner cavity with the silicon dopant material mixture.

The outer diameter of the prefired tubular silicon carbide preform was then coated with a barrier mixture comprising by weight about 50% −325 wollastonite (NYCO Corporation, Willsboro, N.Y.) and about 50% YK Thinner (ZYP Coatings, Inc., Oak Ridge, Tenn.). The barrier material was formed by combining 2 parts by weight of the −325 mesh wollastonite, about 2 parts by weight of the YK Thinner and about 1 part by weight of about 1 inch (25 mm) diameter alumina milling balls in a NALGENE ® plastic jar (Nalge Co., Rochester, N.Y.), closing the plastic jar and placing the plastic jar on a jar mill for about 4 hours. The barrier mixture was separated from the alumina milling media, and the barrier mixture was spray coated onto the outer diameter of the prefired tubular silicon carbide preform using a commercially available paint sprayer. The above process steps were repeated to form three additional barrier coated prefired tubular silicon carbide preforms, for a total of four.

Figure 11:
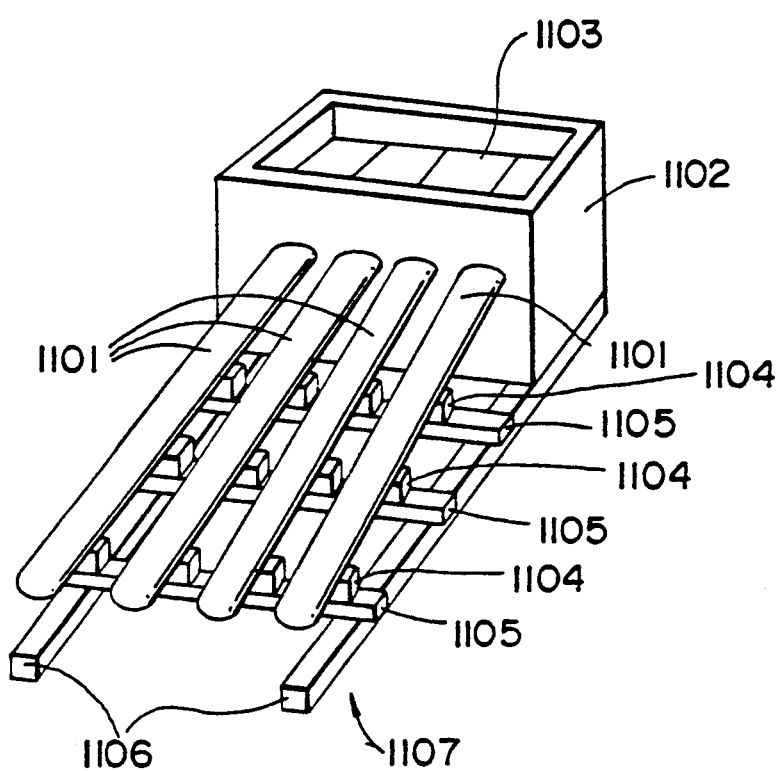
FIG. 11 is an isometric schematic of the lay-up used to grow the ceramic matrix composite bodies having a tubular shape of Example 11.

As depicted in FIG. 11, the four barrier coated prefired tubular silicon carbide preforms 1101 were placed horizontally and attached to an alloy reservoir 1102 made from plaster of paris. The preforms 1101 and alloy reservoir 1102, supported by two CRYSTAR ® silicon carbide beams 1106, were filled with solid parent metal having a composition of Alloy 2 as described in Example 9 to form a lay-up 1107. The lay-up 1107 was placed into a resistance heated air atmosphere furnace. The furnace and its contents were then heated from about room temperature to about 80° C., held at about 80° C. for about 4 hours, then heated from about 80° C. to about 800° C. in about 8 hours, held at about 800° C. for about 1.5 hours, during which time additional parent metal was added to the alloy reservoir 1102 to ensure that sufficient parent metal was available to produce sufficient oxidation reaction product to substantially completely embed the preforms 1011. After parent metal had been supplied, the furnace and its contents were heated from about 800° C. to about 950° C. At about 950° C., forced air, flowing at about 10 liters per minute, was provided to the lay-up through stainless steel tubing having an outer diameter of about 0.25 inches (63 mm) and having holes spaced to evenly distribute the flow. After about 33 hours at about 950° C., the power to the furnace and the forced air were interrupted, and the remaining parent metal was drained from within the inner diameter of the grown ceramic matrix composite bodies having a tubular shape. The furnace and its contents were then allowed to cool to about room temperature. At about room temperature, the surface of the ceramic matrix composite bodies were sandblasted to remove any residual barrier material and the inner diameters of the ceramic matrix composite bodies were cleaned of any residual parent metal.

The metallic constituent of the surfaces of the four tubular ceramic matrix composite bodies was then removed by immersing the ceramic matrix composite bodies into an HF/HNO$_3$ solution, as described in Example 9, for about 2 hours.

The surface etched ceramic matrix composite bodies were then immersed into a solution comprising by weight about 66% ALBRITE ® monoaluminum phosphate (i.e., Al(H$_2$PO$_4$)$_3$) and about 33% deionized water. After the monoaluminum phosphate-coated ceramic matrix composite bodies were allowed to dry overnight, they were placed into an air atmosphere furnace, supported at opposite ends by commercially available alumina rods, at about room temperature. The furnace and its contents were then heated from about room temperature to about 1500° C. at a rate of about 350° C. per hour. After about an hour at about 1500° C., the power to the furnace was interrupted and the furnace and its contents were allowed to cool to room temperature. At about room temperature, it was noted that a protective region or coating had formed on the surfaces of the tubular ceramic matrix composite bodies.

Thus, this Example demonstrates that the method of the present invention can be used to form a protective region or coating on the surfaces of large ceramic matrix composite bodies.

What is claimed is:

1. A method for producing a self-supporting ceramic structure comprising (i) a ceramic matrix obtained by oxidation of a parent metal to form a polycrystalline material comprising an oxidation reaction product and at least one additional constituent, and (ii) a protective surface region on at least a portion of a surface of the ceramic matrix comprising a primary chemical constituent different from the primary chemical constituent of the ceramic matrix, comprising the steps of:

(a) heating a parent metal in the presence of an oxidant to a temperature above the melting point of said parent metal but below the melting point of said oxidation reaction product to form a body of molten parent metal;

(b) reacting said body of molten parent metal with said oxidant at said temperature to permit said oxidation reaction product to form;

(c) maintaining at least a portion of said oxidation reaction product in contact with and between said molten parent metal and said oxidant at said temperature to progressively draw molten parent metal through said oxidation reaction product towards said oxidant to permit fresh oxidation reaction product to continue to form at an interface between said oxidant and previously formed oxidation reaction product, thereby forming said polycrystalline material;

(d) providing at least one external material on at least a portion of said polycrystalline material; and (e) heating said polycrystalline material to a second temperature, said second temperature being sufficient to induce at least two constituents of said polycrystalline material to react with at least a portion of said at least one external material to form at least one protective surface region on at least a portion of the surface of the ceramic matrix to form said ceramic structure.

2. A method for producing a self-supporting ceramic composite structure comprising (i) a ceramic matrix obtained by oxidation of a parent metal to form a polycrystalline material comprising an oxidation reaction product and at least one additional constituent, (ii) a filler material, and (iii) a protective surface region on at least a portion of a surface of the ceramic matrix comprising a primary chemical constituent different from the primary chemical constituent of the ceramic matrix, comprising the steps of:

(a) heating a parent metal in the presence of an oxidant to a temperature above the melting point of said parent metal but below the melting point of said oxidation reaction product to form a body of molten parent metal;

(b) providing a filler material in contact with said parent metal;

(c) reacting said body of molten parent metal with said oxidant at said temperature to permit said oxidation reaction product to form which at least partially embeds said filler material;

(d) maintaining at least a portion of said oxidation reaction product in contact with and between said molten parent metal and said oxidant at said temperature to progressively draw molten parent metal through said oxidation reaction product towards said oxidant to permit fresh oxidation reaction product to continue to form at an interface between said oxidant and previously formed oxidation reaction product, thereby forming said polycrystalline material at least partially embedding said filler material;

(e) providing at least one external material on at least a portion of said polycrystalline material; and (f) heating said polycrystalline material at least partially embedding said filler material to a second temperature, said second temperature being sufficient to induce at least one of (i) at least two constituents of said polycrystalline material or (ii) at least one constituent of said polycrystalline material and at least a portion of said at least partially embedded filler material to react with at least a portion of said at least one external material to form at least one protective surface region on at least a portion of the surface of the ceramic matrix to form said ceramic composite structure.

3. A method for producing a self-supporting ceramic structure comprising (i) a ceramic matrix comprising alumina obtained by oxidation of an aluminum metal to form a polycrystalline material comprising an oxidation reaction product and at least one additional constituent, and (ii) a protective surface region on at least a portion of a surface of the ceramic matrix comprising a primary chemical constituent different from the primary chemical constituent of the ceramic matrix comprising alumina, comprising the steps of:

(a) heating an aluminum metal in the presence of an oxidant comprising air to a temperature above the melting point of said aluminum metal but below the melting point of said oxidation reaction product to form a body of molten aluminum metal;

(b) reacting said body of molten aluminum metal with said oxidant comprising air at said temperature to permit said oxidation reaction product to form;

(c) maintaining at least a portion of said oxidation reaction product in contact with and between said molten aluminum metal and said oxidant comprising air at said temperature to progressively draw molten aluminum metal through said oxidation reaction product towards said oxidant to permit fresh oxidation reaction product to continue to form at an interface between said oxidant and previously formed oxidation reaction product, thereby forming said polycrystalline material;

(d) providing at least one external material on at least a portion of said polycrystalline material; and (e) heating said polycrystalline material to a second temperature, said second temperature being sufficient to induce at least two constituents of said polycrystalline material to react to form at least one protective surface region on at least a portion of the surface of the ceramic matrix comprising alumina to form said ceramic structure.

4. The method of claim 1, wherein said parent metal comprises a material selected from the group consisting of aluminum, silicon, titanium, tin and zirconium.

5. The method of claim 2, wherein said parent metal comprises a material selected from the group consisting of aluminum, silicon, titanium, tin and zirconium.

6. The method of claim 1, wherein said parent metal is provided with at least one dopant.

7. The method of claim 2, wherein at least one dopant is provided to at least one of said parent metal and said filler material.

8. The method of claim 6, wherein said at least one dopant comprises at least one material selected from the group consisting of magnesium, zinc, silicon, germanium, tin, lead, sodium, lithium, calcium, boron, phosphorous, yttrium and rare earth metals.

9. The method of claim 7, wherein said at least one dopant comprises at least one material selected from the group consisting of magnesium, zinc, silicon, germanium, tin, lead, sodium, lithium, calcium, boron, phosphorous, yttrium and rare earth metals.

10. The method of claim 6, wherein said at least one dopant is applied as a layer of dopant onto a surface of said parent metal, and including forming the oxidation reaction product through and beyond the depth of the applied layer of dopant.

11. The method of claim 7, wherein said at least one dopant is applied as a layer of dopant onto a surface of said parent metal, and including forming the oxidation reaction product through and beyond the depth of the applied layer of dopant.

12. The method of claim 1, wherein said at least one external material comprises at least one material selected from group consisting of aluminum titanate, titanium oxide, mono-aluminum phosphate, calcium silicate, alumina, silica, chromium oxide, calcium phosphate, calcium carbonate and mixtures thereof.

13. The method of claim 2, wherein said at least one external material comprises at least one material selected from group consisting of aluminum titanate, titanium oxide, mono-aluminum phosphate, calcium silicate, alumina, silica, chromium oxide, calcium phosphate, calcium carbonate and mixtures thereof.

14. The method of claim 3, wherein said at least one external material comprises at least one material selected from group consisting of aluminum titanate, titanium oxide, mono-aluminum phosphate, calcium silicate, alumina, silica, chromium oxide, calcium phosphate, calcium carbonate and mixtures thereof.

15. The method of claim 14, wherein said at least one external material comprises mono-aluminum phosphate.

16. The method of claim 14, wherein said at least one external material comprises alumina and silica.

17. The method of claim 14, wherein said at least one external material comprises aluminum titanate and titania.

18. The method of claim 14, wherein said at least one external material comprises alumina.

19. The method of claim 1, wherein said providing of said at least one external material comprises substantially completely coating said surface of said ceramic matrix.

20. The method of claim 2, wherein said providing of said at least one external material comprises substantially completely coating said surface of said ceramic matrix.

21. The method of claim 3, wherein said providing of said at least one external material comprises substantially completely coating said surface of said ceramic matrix.

22. The method of claim 2, wherein said filler material comprises at least one material selected from the group consisting of aluminum oxide, silicon carbide, silicon aluminum oxynitride, zirconium oxide, zirconium boride, titanium nitride, barium titanate, boron nitride, silicon nitride, magnesium aluminate spinel, and mixtures thereof.

23. The method of claim 2, wherein said filler material comprises silicon carbide, said parent metal comprises aluminum, and said at least one external material comprises alumina and silica.

24. The method of claim 2, wherein said filler material comprises silicon carbide, said parent metal comprises aluminum, and said at least one external material comprises aluminum titanate and titania.

25. The method of claim 2, wherein said filler material comprises silicon carbide, said parent metal comprises aluminum, and said at least one external material comprises mono-aluminum phosphate and calcium carbonate.

26. The method of claim 2, wherein said filler material comprises silicon carbide, said parent metal comprises aluminum, and said at least one external material comprises mono-aluminum phosphate.

27. The method of claim 1, wherein prior to providing said at least one external material on at least a portion of said polycrystalline material, said polycrystalline material is subjected to a treatment to remove at least portion of said at least one additional constituent, wherein said at least one additional constituent comprises a metallic constituent.

28. The method of claim 2, wherein prior to providing said at least one external material on at least a portion of said polycrystalline material, said polycrystalline material is subjected to a treatment to remove at least portion of said at least one additional constituent, wherein said at least one additional constituent comprises a metallic constituent.

29. The method of claim 3, wherein prior to providing said at least one external material on at least a portion of said polycrystalline material, said polycrystalline material is subjected to a treatment to remove at least portion of said at least one additional constituent, wherein said at least one additional constituent comprises aluminum.

30. The method of claim 27, wherein said treatment comprises at least one treatment selected from the group consisting of thermal etching, chemical etching, vacuum etching and vaporization.

31. The method of claim 28, wherein said treatment comprises at least one treatment selected from the group consisting of thermal etching, chemical etching, vacuum etching and vaporization.

32. The method of claim 29, wherein said treatment comprises at least one treatment selected from the group consisting of thermal etching, chemical etching, vacuum etching and vaporization.

* * * * *